United States Patent
Crouse et al.

(10) Patent No.: US 10,745,263 B2
(45) Date of Patent: Aug. 18, 2020

(54) CONTAINER FILL LEVEL INDICATION SYSTEM USING A MACHINE LEARNING ALGORITHM

(71) Applicant: SONICU, LLC, Greenfield, IN (US)

(72) Inventors: Kent Eldon Crouse, Greenfield, IN (US); Jason Young, Charlotte, NC (US); Clay Hopf, Indianapolis, IN (US)

(73) Assignee: Sonicu, LLC, Greenfield, IN (US)

( * ) Notice: Subject to any disclaimer, the term of this patent is extended or adjusted under 35 U.S.C. 154(b) by 288 days.

(21) Appl. No.: 15/723,993

(22) Filed: Oct. 3, 2017

(65) Prior Publication Data
US 2018/0044159 A1 Feb. 15, 2018

Related U.S. Application Data

(63) Continuation-in-part of application No. 15/168,008, filed on May 28, 2016, now abandoned.
(Continued)

(51) Int. Cl.
*B67D 1/04* (2006.01)
*G01F 23/296* (2006.01)
(Continued)

(52) U.S. Cl.
CPC ............ *B67D 1/0406* (2013.01); *F17C 1/005* (2013.01); *F17C 1/04* (2013.01); *F17C 1/12* (2013.01);
(Continued)

(58) Field of Classification Search
CPC .................................. G01M 3/26; G01F 17/00
See application file for complete search history.

(56) References Cited

U.S. PATENT DOCUMENTS 3,163,843 A    12/1964    Dieckamp
4,679,430 A    7/1987    Scott-Kestin et al.
(Continued)

FOREIGN PATENT DOCUMENTS

CN    683208    1/1994
CN    102705955    1/2016
(Continued)

OTHER PUBLICATIONS

Office Action issued by the USPTO dated Aug. 8, 2018 for U.S. Appl. No. 15/168,005.
(Continued)

*Primary Examiner* — Talia F Crawley
(74) *Attorney, Agent, or Firm* — Frost Brown Todd LLC; Dennis S. Schell

(57) ABSTRACT

A liquid container refill management system including a machine learning algorithm and method of training the same, the system and method making use of noninvasive tank-in-tank measuring techniques. The system can comprise of a container fill level indicator. The container fill level indicator can be capable of detecting a vibration response signal on the outer surface of a container, wherein the system is capable of transmitting the response signal to a remote data processor for processing using a trained machine learning algorithm. The trained machine learning algorithm can be trained by the process of selecting model inputs and outputs to define an internal structure of the machine learning algorithm, applying a collection of input and output data samples to train the machine learning algorithm, and verifying the accuracy of the machine learning algorithm by applying input data samples and comparing received output values with expected output values.

21 Claims, 20 Drawing Sheets

Related U.S. Application Data

(60) Provisional application No. 62/403,453, filed on Oct. 3, 2016, provisional application No. 62/167,376, filed on May 28, 2015, provisional application No. 62/338,166, filed on May 18, 2016.

(51) Int. Cl.

| | | |
|---|---|---|
| *F17C 1/12* | (2006.01) | |
| *F17C 7/04* | (2006.01) | |
| *G06N 3/08* | (2006.01) | |
| *G06N 20/00* | (2019.01) | |
| *G01M 3/32* | (2006.01) | |
| *F17C 13/00* | (2006.01) | |
| *F17C 13/02* | (2006.01) | |
| *F17C 1/00* | (2006.01) | |
| *G01F 22/00* | (2006.01) | |
| *G06Q 10/08* | (2012.01) | |
| *G01F 23/00* | (2006.01) | |
| *F17C 1/04* | (2006.01) | |
| *B67D 1/00* | (2006.01) | |

(52) U.S. Cl.
CPC .............. *F17C 7/04* (2013.01); *F17C 13/003* (2013.01); *F17C 13/02* (2013.01); *F17C 13/021* (2013.01); *G01F 22/00* (2013.01); *G01F 23/0069* (2013.01); *G01F 23/296* (2013.01); *G01F 23/2961* (2013.01); *G01M 3/3245* (2013.01); *G06N 3/08* (2013.01); *G06N 20/00* (2019.01); *G06Q 10/087* (2013.01); *B67D 1/008* (2013.01); *B67D 2001/0091* (2013.01); *B67D 2001/0092* (2013.01); *F17C 2201/032* (2013.01); *F17C 2201/056* (2013.01); *F17C 2201/058* (2013.01); *F17C 2203/032* (2013.01); *F17C 2203/0391* (2013.01); *F17C 2203/0617* (2013.01); *F17C 2203/0629* (2013.01); *F17C 2203/0639* (2013.01); *F17C 2205/058* (2013.01); *F17C 2221/013* (2013.01); *F17C 2223/0153* (2013.01); *F17C 2223/033* (2013.01); *F17C 2250/032* (2013.01); *F17C 2250/034* (2013.01); *F17C 2250/036* (2013.01); *F17C 2250/0408* (2013.01); *F17C 2250/0417* (2013.01); *F17C 2250/0465* (2013.01); *F17C 2250/0491* (2013.01); *F17C 2250/0495* (2013.01); *F17C 2260/024* (2013.01); *F17C 2270/0745* (2013.01); *G01F 23/2966* (2013.01)

(56) References Cited

U.S. PATENT DOCUMENTS

| | | | |
|---|---|---|---|
| 4,749,988 A | 6/1988 | Berman et al. | |
| 4,782,215 A | 11/1988 | Kadwell et al. | |
| 5,438,868 A | 8/1995 | Holden et al. | |
| 5,686,658 A | 11/1997 | Boren | |
| 5,844,992 A | 12/1998 | Boyer | |
| 5,983,198 A | 11/1999 | Mowery et al. | |
| 6,023,178 A | 2/2000 | Shioya et al. | |
| 6,192,752 B1 | 2/2001 | Blaine | |
| 6,203,184 B1 | 3/2001 | O'Callaghan | |
| 6,330,823 B1 | 12/2001 | Raymond | |
| 6,411,891 B1 | 6/2002 | Jones | |
| 6,672,155 B2* | 1/2004 | Muller | G01S 13/88 73/290 V |
| 6,751,602 B2* | 6/2004 | Kotoulas | F16F 15/02 700/280 |
| 6,795,823 B1 | 9/2004 | Aklepi et al. | |
| 6,925,868 B2* | 8/2005 | Young | G01F 23/2966 73/149 |
| 7,021,142 B2 | 4/2006 | Roark | |
| 7,114,390 B2* | 10/2006 | Lizon | G01F 23/2961 73/290 V |
| 7,216,536 B2* | 5/2007 | Young | G01F 17/00 73/290 V |
| 7,499,250 B2 | 3/2009 | Zhang | |
| 7,689,394 B2 | 3/2010 | Furem et al. | |
| 7,819,003 B2* | 10/2010 | Breed | B60C 19/00 73/290 V |
| 7,894,938 B1 | 2/2011 | Arora et al. | |
| 8,516,568 B2 | 8/2013 | Cohen | |
| 8,532,839 B2 | 9/2013 | Drees et al. | |
| 8,708,883 B2 | 4/2014 | Ten et al. | |
| 8,774,368 B2 | 7/2014 | Bentley et al. | |
| 8,798,913 B2 | 8/2014 | Humphrey | |
| 8,995,670 B2 | 3/2015 | Lambert | |
| 9,057,638 B2 | 6/2015 | Cameron | |
| 9,129,223 B1 | 9/2015 | Velusamy et al. | |
| 9,221,667 B2 | 12/2015 | Hershberger | |
| 9,285,802 B2 | 3/2016 | Arensmeier | |
| 2001/0042574 A1 | 11/2001 | Reynolds | |
| 2003/0172745 A1 | 9/2003 | Mitchinson | |
| 2004/0149030 A1* | 8/2004 | Heilig | G01F 23/2967 73/290 V |
| 2004/0220844 A1 | 11/2004 | Sanville et al. | |
| 2005/0204820 A1* | 9/2005 | Treiber | G01N 29/46 73/649 |
| 2006/0021448 A1* | 2/2006 | Young | G01F 23/2966 73/861.18 |
| 2007/0251461 A1 | 11/2007 | Reichard et al. | |
| 2008/0104969 A1* | 5/2008 | Heise | F17C 13/02 62/49.2 |
| 2008/0156092 A1 | 7/2008 | Boiarski | |
| 2008/0159547 A1 | 7/2008 | Schuler et al. | |
| 2009/0218980 A1 | 9/2009 | Bilac et al. | |
| 2009/0243863 A1 | 10/2009 | Lease | |
| 2011/0146803 A1 | 6/2011 | Wu | |
| 2011/0217624 A1 | 9/2011 | Zhou et al. | |
| 2011/0272043 A1 | 11/2011 | Hollingsworth et al. | |
| 2012/0132656 A1 | 5/2012 | Nakken et al. | |
| 2013/0033381 A1 | 2/2013 | Breed | |
| 2013/0312494 A1 | 11/2013 | Nishimura | |
| 2013/0314244 A1 | 11/2013 | Hershberger | |
| 2014/0096863 A1 | 4/2014 | Herrmann | |
| 2014/0262134 A1 | 9/2014 | Arensmeier et al. | |
| 2014/0282944 A1 | 9/2014 | Li | |
| 2015/0029001 A1 | 1/2015 | Pleshek | |
| 2015/0109143 A1 | 4/2015 | Hershberger | |
| 2015/0110276 A1 | 4/2015 | Gereb | |
| 2015/0142621 A1 | 5/2015 | Gray | |
| 2015/0152451 A1 | 6/2015 | Gupta et al. | |
| 2015/0223646 A1 | 8/2015 | Wegelin et al. | |
| 2015/0245139 A1 | 8/2015 | Park | |
| 2015/0253231 A1 | 9/2015 | Gao | |
| 2015/0306335 A1 | 10/2015 | Winski | |
| 2015/0326680 A1 | 11/2015 | Farahani | |
| 2015/0341302 A1 | 11/2015 | Balachandran et al. | |
| 2015/0346017 A1 | 12/2015 | Leport | |
| 2015/0350799 A1 | 12/2015 | Schnaare | |
| 2016/0059412 A1 | 3/2016 | Oleynik | |
| 2016/0134949 A1 | 5/2016 | Kekalainen | |
| 2016/0245279 A1* | 8/2016 | Pal | G01M 3/025 |
| 2016/0264394 A1 | 9/2016 | Hershberger | |
| 2016/0286993 A1 | 10/2016 | Pau | |
| 2016/0299511 A1 | 10/2016 | de Kontz et al. | |

FOREIGN PATENT DOCUMENTS

| | | |
|---|---|---|
| EP | 63584 | 11/1982 |
| EP | 119790 | 9/1984 |
| EP | 1215471 | 6/2002 |
| EP | 0837294 | 4/2006 |
| GB | 2164180 | 3/1986 |
| JP | 4018374 | 12/2007 |
| WO | 2009118542 | 10/2009 |
| WO | 2011051949 | 5/2011 |

(56) References Cited

FOREIGN PATENT DOCUMENTS

| WO | 2014197542 | 12/2014 |
|---|---|---|
| WO | 2015124892 | 8/2015 |
| WO | 2015191722 | 12/2015 |

OTHER PUBLICATIONS

Office Action issued by the USPTO dated Mar. 1, 2018 for U.S. Appl. No. 15/168,008.
Final Office Action dated Dec. 14, 2018 for U.S. Appl. No. 15/168,005.
Analog Devices, "Small, Low Power, 3-Axis 3 g Accelerometer ADXL335, Data Sheet".
Diodes Incorporated, "2.5 W Filterless Class-D Mono Audio Amplifier; Data Sheet", Apr. 2013.
Freescale Semiconductor, Inc., "Miniature I2C Digital Barometer; Data Sheet", Feb. 2013.
Silicon Labs, "I 2 C Humidity and Temperature Sensor Si7021-A20;Data Sheet", Jun. 2015.
Solomon Systech, "128 × 64 Dot Matrix OLED/PLED Segment/Common Diver with Controller; SSD1306 Data Sheet", Apr. 2008.
Tectonic Elements Ltd., "HIHX14CO2-8 Compact audio exciter; HiHX14C02-8 Data Sheet".
Univision Technology Inc., "OEL Display Module Product Specification; Data Sheet", Jun. 5, 2009.
IKEG LLC,How does KegData Work?, Retrieved from http://www.kegdata.com/about-keg-data.
APGSensors, Tank Cloud Remote Tank Level Monitoring, 2014-2016 (Copyright); Retrieved from https://www.apgsensors.com/remote-monitoring.
Tempalert, Wireless Sensor, 2016, Retrieved from http://shop.tempalert.com/wireless-temperature-sensor.aspx.
Netbiter, Remote Monitoring of Tanks, 2016, Retrieved from https://www.netbiter.com/applications/water-and-wastewater/tank-monitoring.
Mike Sherer, Remote Beer Dispensing For Fun and Profit, Dec. 30, 2012, Retrieved from http://www.micromatic.com/Remote-Beer-Dispensing-for-Fun-and-Profit.
Valarm, Remote Tank Monitoring in Real-Time, 2016, Retrieved from http://www.valarm.net/blog/remote-tank-monitoring-in-real-time/.
M2MSolutions, Ground Fuel Tank & Water Tank Level Remote Monitoring, 2015, Retrieved from http://www.m2m-solutions.rs/index.php/m2m-solutions/tank-level-monitoring.html.
Tanklink, Tanklink CaseStudy, Jul. 2015.
Victoria J. Hodge, Simon O'Keefe, Michael Weeks, Anthony Moulds, Wireless Sensor Networks For Condition Monitoring In The Railway Industry: A Survey; Jun. 3, 2015, Retrieved from: http://ieeexplore.ieee.org/stamp/stamp.jsp?reload=true&arnumber=6963375.
Dalia Kriksciuniene, Tomas Pitner, Adam Kucera, Data Analysis In The Intelligent Building Environment, vol. 11 No. 1, pp. 1-17, 2014.
Jinzhu Chen, Yu Wang, Guoliang Xing, Dirk Colbry, A Sensor System for High Fidelity Temperature Distribution Forecasting in Data Centers, 2014.
Yuebin Yu, Denchai Woradechjumroen, Daihong Y, A Review of Fault Detection and Diagnosis Methodologies on Air Handling Units, 2013, from http://digitalcommons.unl.edu/cgi/viewcontent.cgi?article=1085&context=archengfacpub.
United States Non-Final Office Action for U.S. Appl. No. 15/168,008 (dated Nov. 2, 2016).
United States Final Office Action for U.S. Appl. No. 15/168,008 (dated May 31, 2017).

* cited by examiner

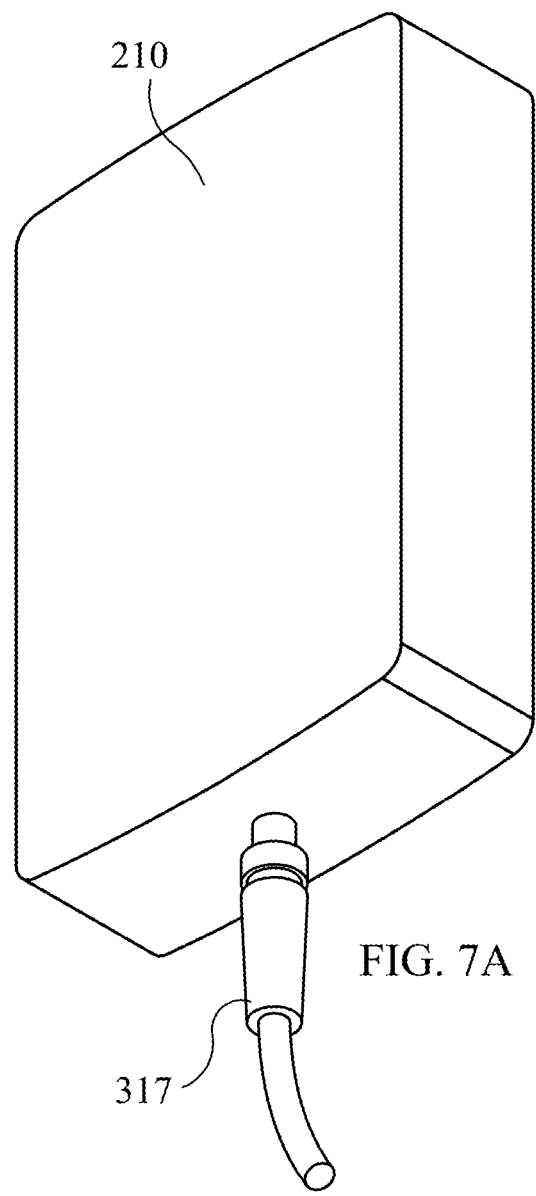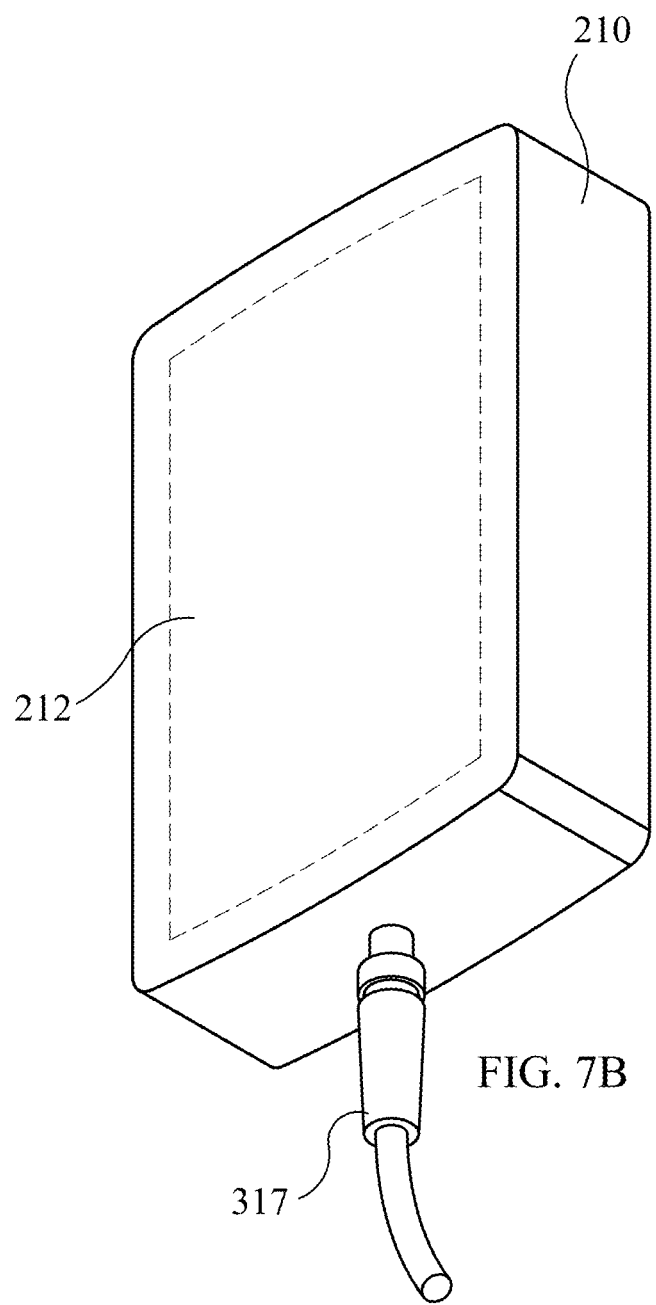
FIG. 7A
FIG. 7B

FIG. 14

CONTAINER FILL LEVEL INDICATION SYSTEM USING A MACHINE LEARNING ALGORITHM

CROSS-REFERENCE TO RELATED APPLICATIONS

The application claims the benefit of U.S. Provisional Patent Application No. 62/403,453, filed Oct. 3, 2016, and is a continuation-in-part of U.S. Nonprovisional patent application Ser. No. 15/168,008, filed May 28, 2016, which claims the benefit of U.S. Provisional Patent Application No. 62/167,376, filed May 28, 2015, and which also claims the benefit of U.S. Provisional Patent Application No. 62/338,166, filed May 18, 2016, the entireties of which are hereby incorporated herein by reference. Any disclaimer that may have occurred during the prosecution of the above-referenced application(s) is hereby expressly rescinded.

TECHNICAL FIELD

The present disclosure relates generally to systems and methods for non-invasively determining the fill level of liquid or gas in a container and, more particularly, to systems and methods for using and training a machine learning algorithm to non-invasively measure the volume of liquid or gas in a container.

BACKGROUND

Restaurants and bars use gas, such as carbon dioxide, to carbonate fountain soft drinks and to preserve and push draught beer. Many restaurants have abandoned high-pressure compressed gas cylinders and are now using liquid bulk carbon dioxide as a safer, low-pressure alternative. Liquid bulk carbon dioxide is stored on the premises at a lower pressure in a sealed holding container, commonly referred to as a tank, and is often refilled on a regular schedule based on a restaurant or bar's usage pattern. The containers are typically a double walled design, having a rigid outer wall forming an outer container and a rigid inner wall forming an inner container with some amount of insulating space between the outer and inner walls, and are permanently installed at their respective locations. A vacuum is generally formed in the insulating space between the inner and outer walls to minimize the heat transfer from the environment. Bulk carbon dioxide container systems are available in different sizes, ranging from 200 pounds to almost 800 pounds of carbon dioxide capacity, to fit the needs of the individual restaurant or bar.

Carbon dioxide is a compound formed by the combination of carbon and oxygen atoms in a 1:2 ratio expressed by the chemical symbol $CO_2$. The weight percentages of carbon and oxygen are 27.3% and 72.7% respectively. Carbon dioxide is a gas at normal atmospheric temperature and pressure. It is colorless, essentially odorless, and about one and a half times denser than air. Depending on the temperature and pressure to which it is subjected, carbon dioxide may exist in the form of a solid, a liquid, or a gas. At a temperature of −69.90 degrees Fahrenheit and a pressure of 60.43 psig carbon dioxide can exist simultaneously in all three phases. This condition is known as the triple point. At temperatures above 87.90 degrees Fahrenheit carbon dioxide can exist only as a gas, regardless of the pressure. This is known as its critical temperature. Liquid carbon dioxide can only exist in a sealed container between the triple point and critical point temperatures under pressure. There is a definite pressure-temperature relationship of the liquid and gas in equilibrium. Normal operational pressures should remain above 165 psig to prevent the liquid carbon dioxide temperature from dropping below the minimum vessel design temperature. Liquid carbon dioxide should never be stored at pressures below 60.5 psig to prevent the formation of solid carbon dioxide or dry ice.

Carbon dioxide storage containers are designed for long-term storage of liquefied carbon dioxide. A typical carbon dioxide storage container is comprised of a steel inner wall encased in an outer steel vacuum shell. The insulation system between the inner and outer containers may consist of multiple layer composite insulation and high vacuum, or simply a high vacuum, to ensure long holding time. The double walled and insulation system, designed for long-term vacuum retention between the walls, is permanently sealed to ensure vacuum integrity.

A problem often experienced by bulk-fill providers relates to the scheduling of bulk container filling. Holidays or weekends can affect carbon dioxide consumption rates in an irregular manner, making it difficult to accurately predict an out-of-gas situation. This problem is compounded by a common issue where the pre-existing container fill level gauges are broken or inaccurate, although the containers themselves are otherwise fully functional. A broken fill level gauge can occur when a given container reaches an empty, or nearly empty, state and the container's mechanical internal float is damaged, for example, from the remaining liquid freezing, rendering the fill level gauge inoperable.

Restaurants and bars need to ensure they are able to continue serving beverages to their customers. Bulk-fill providers need to be able to accurately identify containers that need to be refilled, avoiding unnecessary and costly premature fill runs. Therefore, restaurants, bars, and bulk-fill providers alike have a need to accurately, and in some cases remotely, determine the fill-level of their carbon dioxide containers.

Additionally, the need exists for a non-invasive means of measuring fill levels that can be retrofitted to existing containers and bulk-fill systems. Although invasive measuring devices, located within the volume of a container, are well known, the placement of an invasive measuring device within the container's inner wall is often not feasible due to any number of negative factors, including the cost of drilling into the container, the risk of possibly contaminating the liquid or gas disposed therein, the introduction of a source for a possible leak path of the liquid or gas from within the container, or structural issues that could be created by breaching the inner and outer walls' structure.

The need also exists for a non-invasive system that can accurately measure the fill-level of containers utilizing a double walled design. Previous non-invasive means of measuring container fill level having a single container wall and a flexible interior bladder and have utilized impactors, solenoids, or vibration generators to vibrate the wall surface of the container, detectors to record the directly resulting response vibrations of the wall surface, and a frequency conversion means to convert the recorded data signal to frequency information and determine the peak resonant frequency response. The fill level of the single-wall container is then determined by comparing the measured peak frequency information to stored frequency and volume information for the container. Although this prior art method may have worked for single-wall containers, a measurement of the direct response of a double walled container's outer wall to vibration does not provide accurate fill level information regarding the inner wall or double walled container as a whole. Additionally, direct frequency readings of the prior art are affected by mid-range and high-range frequency ambient noise, including the common occurrence of container venting.

It is therefore desired that a retrofitting system and method for using the same be provided that is capable of obtaining an accurate measurement of liquid or gas volume within a double walled or single wall container in a noninvasive manner that is not affected by mid-range or high-range frequency ambient noise.

SUMMARY

In accordance with one embodiment of the present disclosure, a container fill level indication system, making use of noninvasive fill level measuring techniques, is provided. The container fill level indication system can include a resonator for vibrating an outer surface of the container, a vibration detecting device for detecting a data signal indicative of a response vibration, a data storage medium storing a machine learning algorithm, a first data processing module for sampling the data signal from the vibration detecting device to provide response data indicative of the response vibration, and a second data processing module inputting the response data into the machine learning algorithm. Further, the machine learning algorithm receiving the response data can be capable of outputting a fill level measurement. The machine learning algorithm can be trained using machine learning, which can include the process of selecting model inputs and outputs to define an internal structure of the machine learning algorithm, applying a collection of input and output data samples to train the machine learning algorithm, and verifying the accuracy of the machine learning algorithm by applying input data samples and comparing received output values with expected output values.

In accordance with aspects of further embodiments of the present disclosure, a method for training a machine learning algorithm, such as a neural network model, to determine a liquid fill level in a container system is provided. A method for training a neural network model to determine a liquid fill level in a container system can include the acts of defining a number of data inputs for a neural network model, collecting a set of vibration response data, selecting an internal structure for the neural network model, applying a first portion of the set of vibration response data to the neural network model, and verifying the accuracy of the neural network model.

Thus, the present invention provides a retrofittable system which can include a machine learning algorithm and a method for training the same that is capable of accurately measuring liquid volume within a container in a noninvasive manner.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and sub-combinations. All such useful, novel, and inventive combinations and sub-combinations are contemplated herein, it being recognized that the explicit expression of each of these combinations is unnecessary.

BRIEF DESCRIPTION OF THE DRAWINGS

The components in the figures are not necessarily to scale or proportion, emphasis instead being placed upon illustrating the principals of exemplary embodiments of the disclosure. Moreover, in the figures, like reference numerals designate corresponding parts throughout the different views.

FIGS. 7A and 7B are a front view and a rear view, respectively, of an illustrative container fill level indicator secondary unit according to the present disclosure;

FIG. 14 is an illustrative report produced by the methods and systems of the present disclosure.

DETAILED DESCRIPTION OF THE ILLUSTRATED EMBODIMENTS

Figure 1:
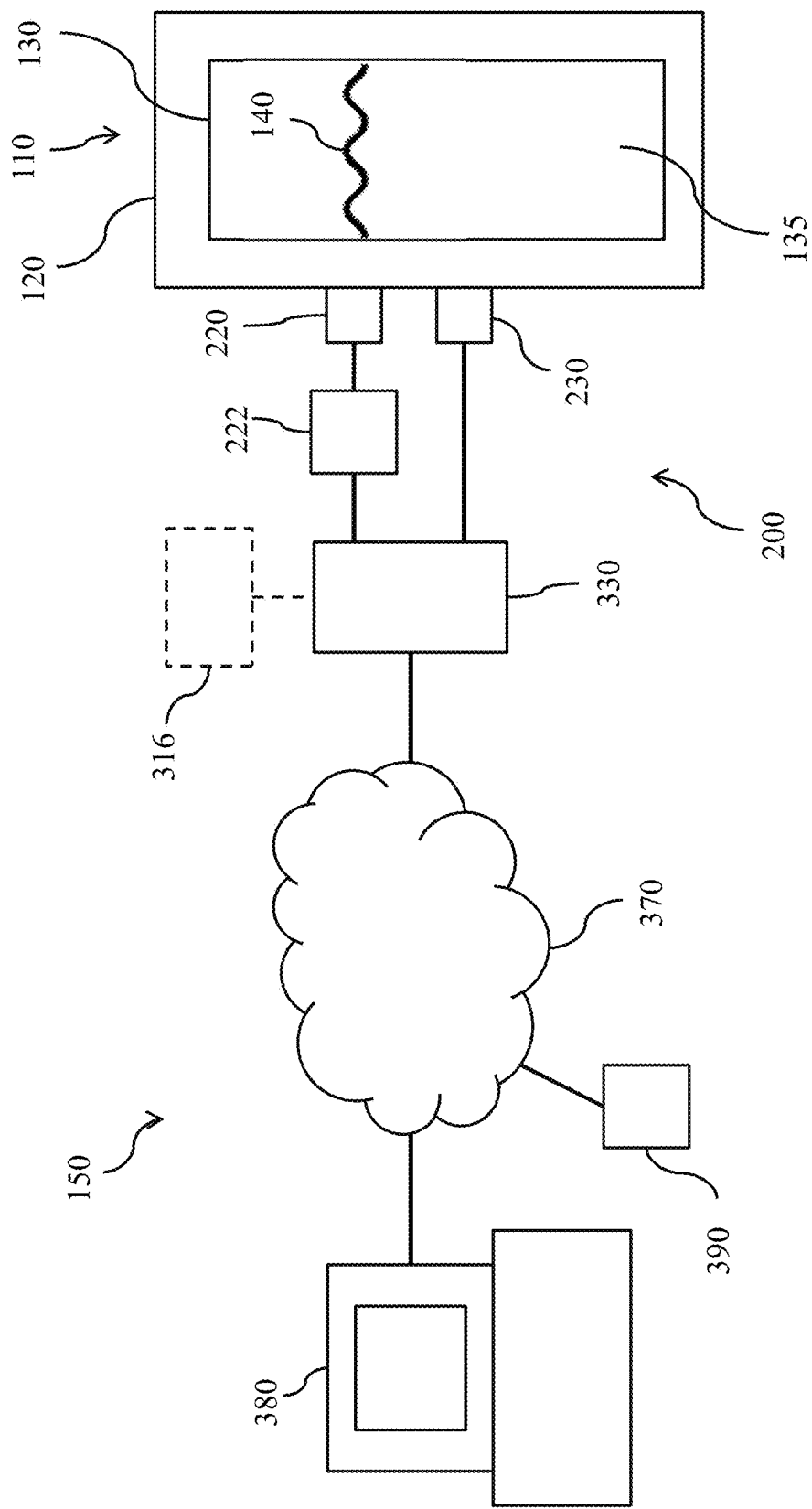
FIG. 1 is a schematic block diagram of an illustrative embodiment of a container fill level indicator system according to the present disclosure.

For the purposes of promoting and understanding the principals of the claimed invention, reference will now be made to one or more illustrative embodiments illustrated in the drawings and specific language will be used to describe the same.

Container fill level indicator system 150, illustrated in FIG. 1, is constructed according to the principles of this disclosure for the purpose of enabling an accurate indication of liquid volume 140 within a liquid container 110 in a non-invasive manner. In one embodiment according to the disclosure, the container 110 can include an outer wall 120 and an inner wall 130 defining an insulating space 125 therebetween. As shown in FIG. 1, an illustrative container fill level indicator 200 according to this disclosure may include: (1) a vibration device 220, such as an exciter or resonator, driven by an amplifier 222 to vibrate the outer wall 120, thereby inducing the vibration of the inner wall 130 and creating a beating effect in the response signal 142 as a result of the interaction of the vibrations of the two walls 122 and 132; (2) a vibration detection device 230, such as an accelerometer, to detect and transmit a data signal indicative of the response signal 142 of the wave interference of the inner and outer walls' resonant vibrations 122 and 132; (3) an analog envelope tracker circuit 232, essentially an AM demodulator, to take the high frequency response signal 142 as input and provides a low-frequency output signal which is the amplitude envelope 143 or beats of the original signal; (4) a data processing device 330, such as a microcontroller, to receive and sample the low-frequency signal from the vibration detection device 230; (5) a display 316; and a (6) wireless transceiver 350, to transmit container fill-level data to a geographically remote server 380 via a wide area network 370. An illustrative container fill level monitoring system 150 includes a geographically remote server 380 having software to determine when the container 110 needs to be refilled and to provide various other methods and processes described herein.

The container fill level indicator 200 of this system can be used either to supplement a built-in indicator gauge (not shown) of the container 110, or in the case of a broken indicator gauge, to function as the primary fill-level indicator. The fill level indicator 200 can include a visual display 316 such as light emitting diodes or a display screen to provide a visual indication of the measured fill level. Alternatively or additionally, the output of the fill level indicator can be transmitted via a wide area network (WAN) 370, including, for example, a wired local area network, WiFi, 900 MHz and/or cellular broadband. Transmitted data can then be processed by the geographically remote server 380, including, for example, to determine the appropriate time to refill the container. In one embodiment the remote server 380 also includes software to determine the fill level 140 based on the transmitted container fill-level data, for example, a machine learning algorithm such as an artificial neural network (ANN) model.

In an illustrative embodiment, the utilization of a cell-based data connection exceeds the coverage capability of 900 MHz communication systems and eliminates the need to integrate with a WiFi network or other LAN and any associated issues, e.g. firewalls, changing passwords, or different SSIDs. Data trending and analysis is performed by remote server 380, e.g. a cloud based server. The data and associated analysis and other services can be accessed and viewed via a web browser via any user computing device 390, eliminating any need for a specialized computing device. The remote server 380 can also interface with Enterprise Resource Planning (ERP) systems so that information is sent directly to users' computing device 390, for example, handheld devices in the field. In the event that multiple storage containers 110 in the same area are monitored, an illustrative embodiment utilizes 900 MHz wireless transceivers 350 for each of the individual indicators 200 to communicate with a single shared broadband wireless transceiver for connectivity with WAN370.

Figure 2A:
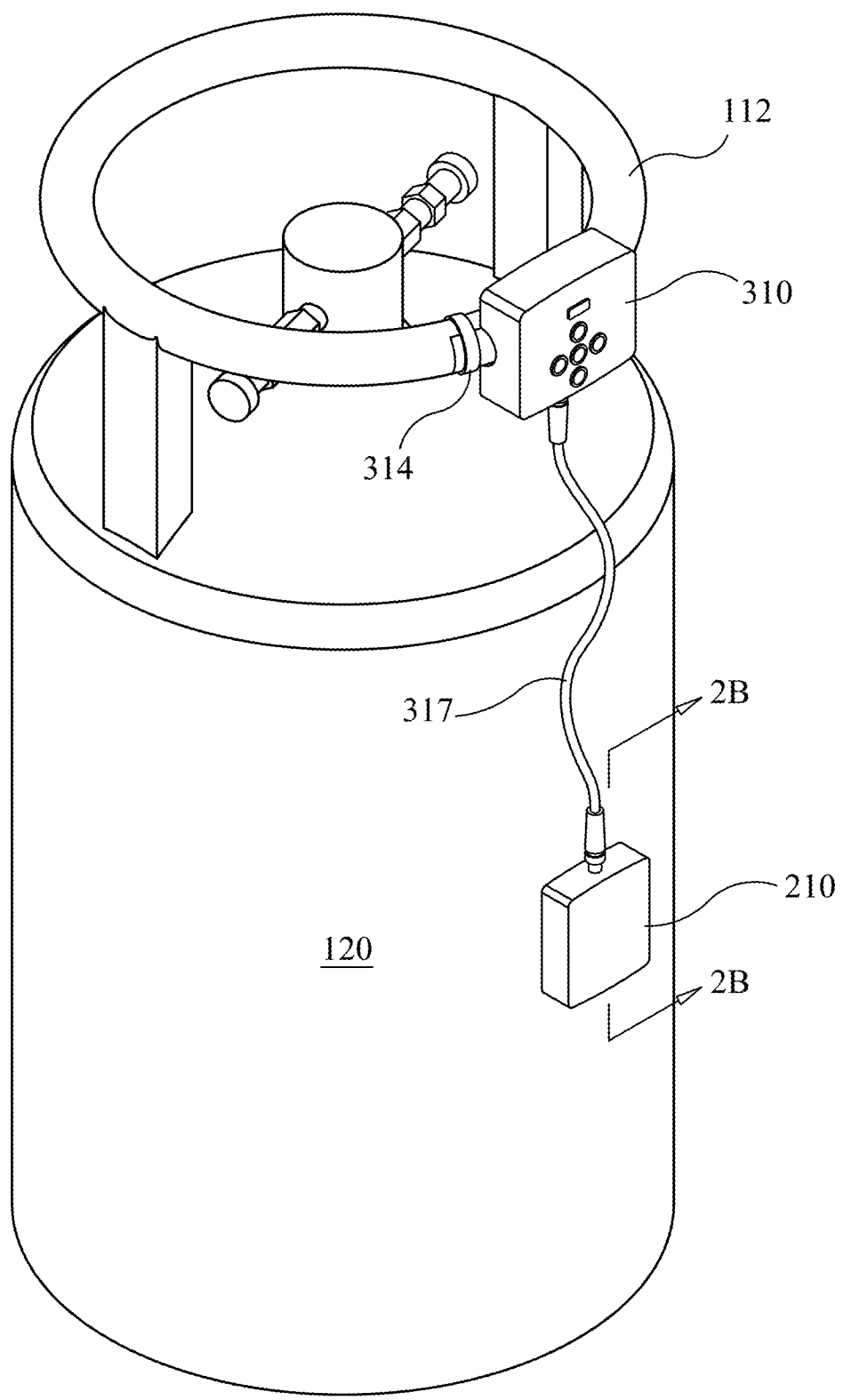
FIG. 2A is an illustrative container, with a vibration device and detection device coupled to the outer surface of the outer wall.

An illustrative embodiment is shown in FIG. 2A, where a vibration device 220, such as a compact audio exciter, part number HIHX14C2-8, available from Tectonic Elements of Cambridge, U.K., is used to vibrate the outer wall 120 of a carbon dioxide container 110 and an accelerometer 222 is used to detect and transmit a data signal indicative of the response signal 142a (shown in FIG. 3A) of the wave interference of the inner and outer walls' resonant vibrations 122 and 132. In an alternative embodiment, the vibration device 220 and the vibration detecting device 222 may be a single dual function device.

Figure 2B:
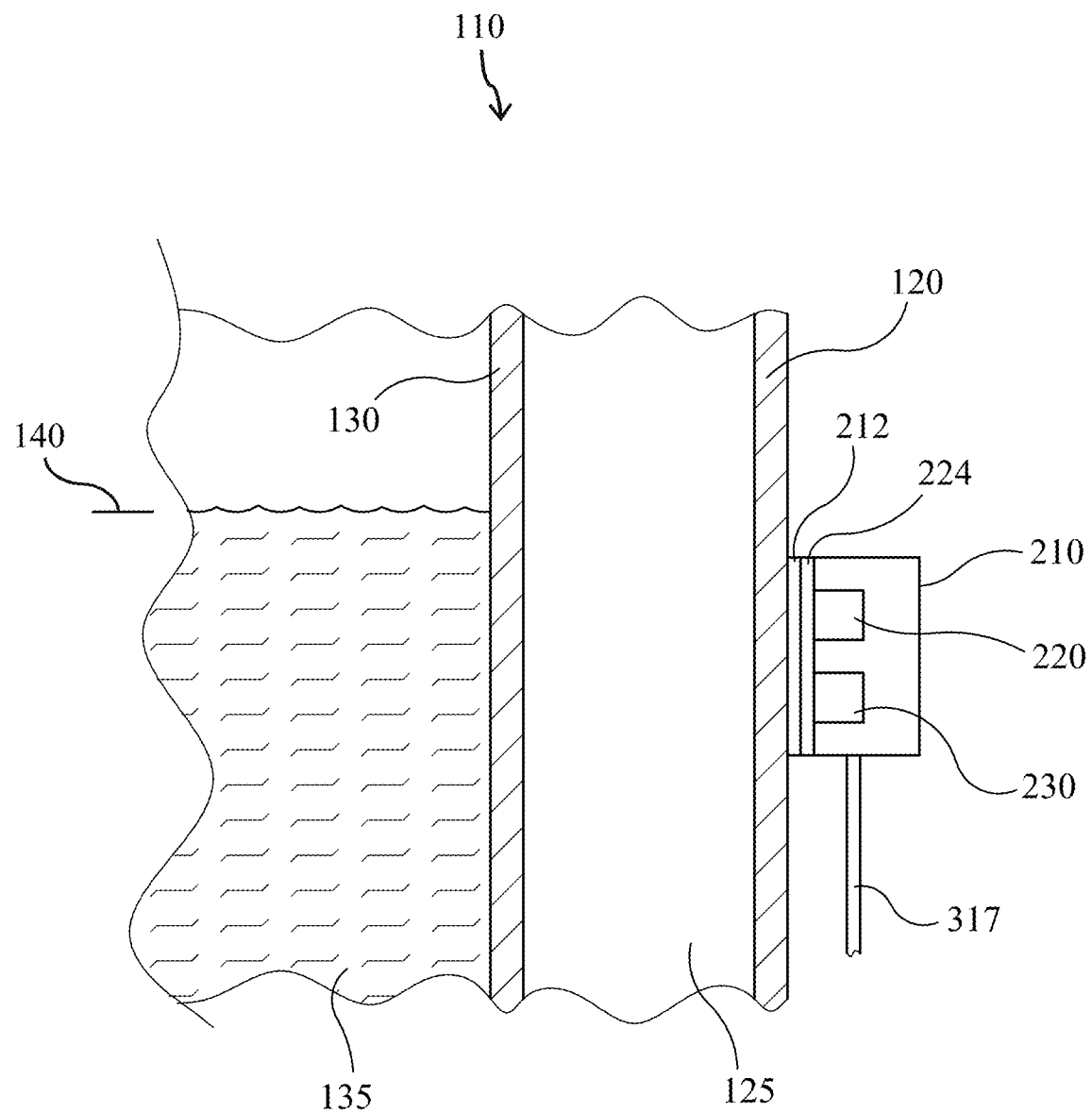
FIG. 2B is a cross sectional view of an illustrative double walled fill level indicator secondary unit, with the secondary unit coupled to the outer surface of the outer wall.

Referring to FIG. 2B, a brief resonant frequency pulse is applied to the outer wall 120 by a vibration device 220, causing a vibration in the outer wall 122 and inducing a vibration of the inner wall 130. The vibratory forces of the inner 130 and outer 120 walls transfer to one another, resulting in a response signal 142a (shown in FIG. 3A) as the waveforms alternately reinforce one another at some times and cancel one another at other times. During times when the vibration from each source adds constructively, the amplitude of the vibration increases; during times when the vibration adds destructively, the amplitude of the vibration decreases. The vibration detection device 230 simply detects the resultant response signal 142a and ant it is processed by data processing device 332. Data processing device 332 can be any control device, including a processor, discrete logic and/or analog devices, or an ASIC, implemented with or without software.

Unlike a loudspeaker that uses a frame and a cone diaphragm to couple vibrations to the surrounding air, the vibration device 220 uses the movement of the device itself to apply force from an exciter voice coil to the mounting surface, which is usually flexible enough to vibrate. As shown in FIG. 2B, the vibration device 220 includes a coupling plate 224 that is directly coupled to the outer wall 120, and transmits vibrations from the vibration device 220 to the surface of the outer wall 120; therefore, the coil or vibrating element does not necessarily directly contact and strike the surface of the outer wall 120. Alternatively, a frame, housing, or coupling plate of the vibration device 220 can be mechanically coupled to the container 110 using a material with preferably high compressive strength and moderate to high bending strength. In an illustrative embodiment, a class-D amplifier or switching amplifier 222 is used to control the voltage applied to a vibration device 220. A class D amplifier is an electronic amplifier in which the amplifying devices operate as electronic switches instead of as linear gain devices as in other amplifiers, thereby providing a high level of efficiency and very little power loss to heat.

Although vibration of the outer wall 120 can be induced at any number of frequencies, it is preferable to vibrate the outer wall 120 at its natural or resonant frequency 122 to increase the efficiency of the vibration device 220. The resonant frequency 122 of the outer wall 120 can be predetermined by tapping the outer wall 120 and analyzing the resulting sound waves induced by resonant vibration using a sound frequency analyzer to identify the outer wall's resonant frequency 122. Alternatively, the outer wall 120 can be vibrated across a range of frequencies that includes the outer wall's resonant frequency 122 and the resonant frequency can be determined by analyzing the response. In an illustrative embodiment, the natural frequency of the outer wall 120 of a 750 pound bulk carbon dioxide container 110 is approximately 200 Hertz. The natural frequency 122 of the outer wall 120 remains constant and is independent of the fill-level 140 of the inner wall 130.

Similarly, vibration can be induced in the outer wall 120 at any number of physical locations of the outer wall 120 surface and it is preferable to identify and vibrate the outer wall 120 in a particularly responsive physical location of the outer wall 120 surface to increase the efficiency of the vibration device 220. A responsive physical location can be predetermined by tapping the outer wall 120 and analyzing the resulting sound or vibration waves using a sound frequency analyzer to identify the most responsive physical location. In an illustrative embodiment, the most responsive location of a 750 pound carbon dioxide container 110 was determined to be about 10 inches below the container's upper horizontal seam.

The natural frequency of the outer wall 120, most responsive physical location of the outer wall 120, and beat characteristics can vary with different forms of double walled construction, including container materials, size, and shape, as well as with different contained liquids. Within common application, there are a reasonably limited number of particular container manufacturers and variations, with a relatively small number of container designs covering a majority of the market; therefore, the characteristics of a particular container and contained liquid, including corresponding beat and fill-level data typically can be predetermined.

Additionally, ambient noise typically found in real-world conditions, including venting that reduces pressure caused by some of the liquid carbon dioxide warming and changing state to a gas, is of a much higher frequency and does not affect the measurement of the resultant response signal 142a. If desired, a bandpass filter or demodulator such as an envelope tracking filter or detector can be used to eliminate higher frequencies and provide the low frequency amplitude envelope 143a associated with the fill level 140 of the container 110. In an illustrative embodiment, a low-frequency accelerometer 222 is used to detect the response signal 142a and an analog envelope tracking circuit 232 eliminates the higher frequency component to provide the resulting low frequency amplitude envelope 143a. An envelope tracking circuit 232 takes the high frequency resultant response signal 142a as an input and provides an output which is the amplitude envelope 143a of the original response signal 142a. Examples of suitable envelope detectors include diode detectors, mixers, squaring cells, absolute value circuits, logarithmic amplifiers, etc., as are known in the art. An illustrative envelope tracking circuit 232 uses low power, single-supply, rail-to-rail operational amplifiers for envelope detection and processing. A typical range of the low frequency amplitude envelope 143a in the response signal 142a in an illustrative embodiment is from approximately 1 hertz to 10 hertz.

A sound exciter, for example, a compact audio exciter such as part number HiHX14C02-8 available from Hiwave Technologies, which was acquired by Tectonic Elements of Cambridge, U.K., is used as a vibration device 220 in an illustrative embodiment. By vibrating a solid object, an audio exciter essentially turns the solid object into a speaker. A typical Class-D mono audio amplifier 222, such as part number PAM8302A available from a Diodes Inc. of Plano, Tex., is used to turn the vibration device 220 on and off such that the output is pulse width modulated, providing for increased efficiency and accuracy in relation to alternative linear amps. An illustrative microcontroller 330 is part number ATXMEGA256A3U available from Atmel Corp of San Jose, Calif. is used as an because it is simple, inexpensive, and capable of a low-current draw deep sleep state. A low power clock 324, such as part number PCF8563 available from NXP Semiconductors N.V. of Eindhoven, Netherlands, is used to wake up the data processing device 330 at a specified interval. An analog accelerometer 222, such as a 3-axis solid-state accelerometer part number ADXL335 available from Analog Devices of Norwood, Mass., detects vibrations. Alternatively, another sensor type used for vibration measurements can be used to detect vibrations, e.g. velocity sensor, proximity probes, or laser displacement sensors. The z-axis is monitored in an illustrative embodiment since only one direction of vibration detection is of interest. An envelope tracker analog processing circuit 232, as known to one of ordinary skill in the art, tracks the envelope of the output of the accelerometer and strips off any high-frequency component providing simplified measurement and a lower required sampling rate of the resulting amplitude envelope 143a.

An analog to digital converter 332, a function performed by the data processing device 330 in an illustrative embodiment, is used to process results from the analog accelerometer 222 and the analog processing circuit 232, in an illustrative embodiment. In one illustrative embodiment, the output of the analog processing circuit 232 is sampled at 50 Hz by an A/D converter 332 of the microprocessor 330. Removing the high frequency component advantageously reduces the required data sampling rate, battery power used, and volume of data required to be stored and/or transmitted for fill level determination. For example, with a resonant frequency of about 200 Hz, a sample rate of greater than 400 Hz would need to be used rather than the much lower rate of 50 Hz in the illustrative embodiment. The data processing device 330 can utilize a high precision voltage reference 334, such as part number REF3030 available from Texas Instruments of Dallas, Tex., to detect extraordinarily small vibrations. In an illustrative embodiment, the voltage reference outputs a precise 3 volts. The digital to analog converter 332 is used to generate a sine wave, such that in an illustrative embodiment, the sine wave is centered at 1.5 volts, modulating between 0 volts and 3 volts. In the illustrative embodiment 384 samples with 12 bit resolution are collected over about 7.7 seconds. For the illustrative embodiment used with a typical double walled container 110, after about 7.7 seconds the resulting response 142a has essentially rung out to a minimal or no amplitude. Depending on factors such as the various design features of indicator 200, the method and desired accuracy of fill level determination from the sampled data, and aspects of the container 110 and the environment, a different number, sampling rate, or bit resolution may be used.

The fill-level indicator 200 can be battery or 120V ac powered. The frequency of fill-level checks can be chosen depending in part upon the power source used and the volume and rate of use of the liquid 135 stored in the container 110. For example, as few as one check a day can be made to conserve power or multiple checks can be made each day if power consumption is not a concern. Likewise, the fill level indicator can be placed in an inactive battery conserving state, when not actively taking measurements or transmitting data, to conserve battery power. The amount of delay between measurements can be determined based on factors such as power consumption and predicted rate of fluid level change.

Figure 3A:
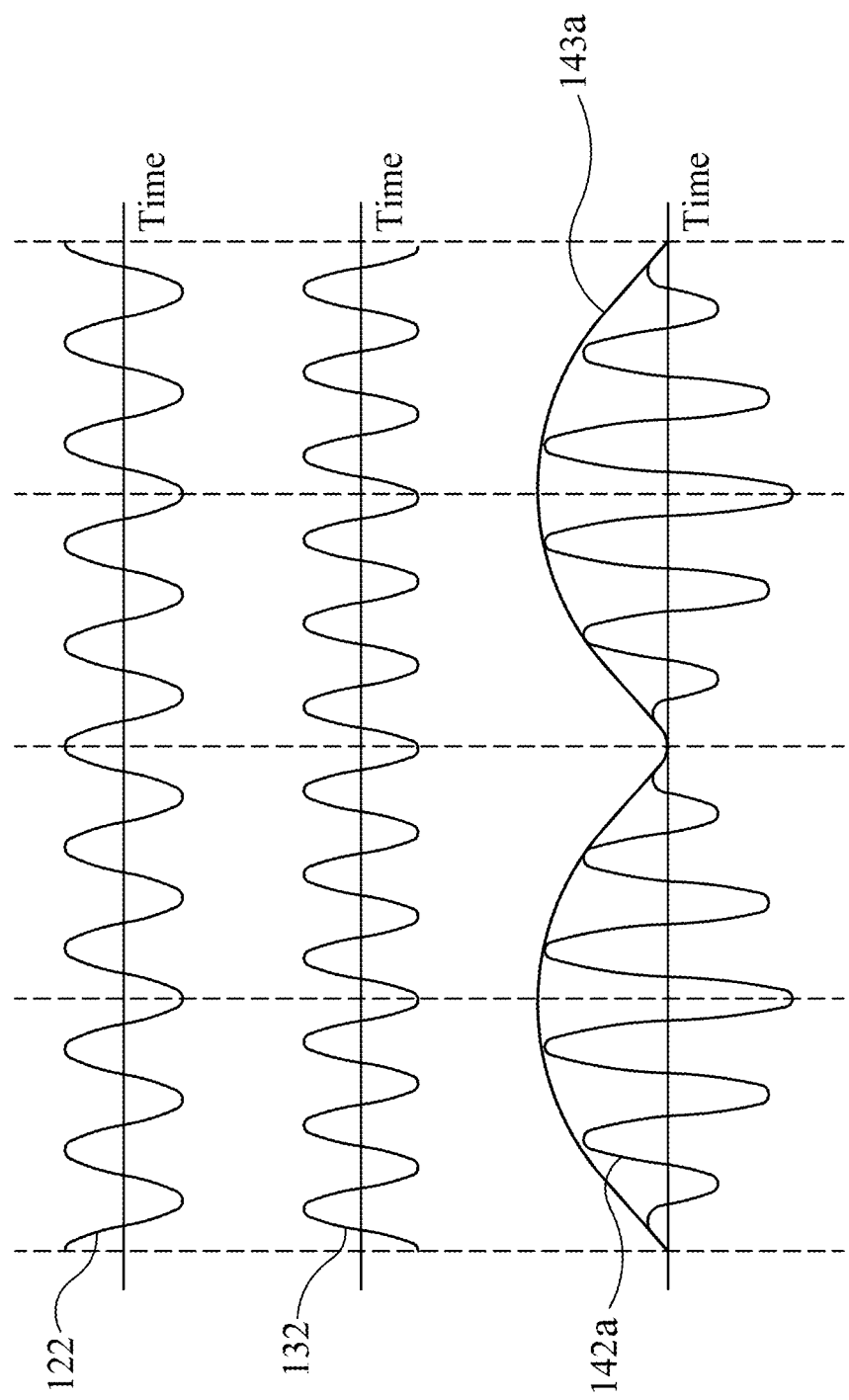
FIG. 3A is an illustration showing the resonant response of an inner and outer wall and a resulting beating effect of the amplitude envelope of the response signal.

Referring to FIG. 3A, a vibration (represented by a waveform/signal of the resonant frequency 122) induced in the outer wall 120 will further induce a vibration (represented by a waveform/signal resonant frequency 132) in the inner wall 130. The vibration of the inner wall 130 will be at a resonant frequency 132 that varies slightly with the fill level 140 of the liquid 135 contained with the inner wall. A resulting combination of the frequencies of the two signals 122 and 132 will be reflected in a resulting response waveform/signal 142.

When two or more sounds or vibrations are present having a frequency difference of less than about 20 or 30 Hz, a beat is formed at the difference frequency. The container fill level indicator 200 associated with system 150 operates on the principle that the inner wall's change in resonant frequency 132 as the liquid volume 140 in the rigid inner wall 130 increases, and thus the number of beats present in the amplitude envelope 143 per time period, resulting from the interaction of the outer wall's resonant frequency, induced by vibration applied to the rigid outer wall by an electromechanical device, or resonator, such as vibration device 220, and the inner wall's resonant frequency 132, induced by the outer wall's resonant frequency 122, decreases.

As an illustration of the formation of a resultant beating effect at a beat frequency, FIG. 3A shows a first frequency 122 representative of the outer wall 120 resonant frequency response to vibration device 220, a second frequency 132 representative of the inner wall 130 variable resonant frequency induced by the first frequency 122 and varied based on fill-level, and the response signal 142a of the two different frequencies. FIG. 3A also shows how the two frequencies 122 and 132 interact with each other constructively or destructively in a double walled container 110, based on a summation of the two signals 122 and 132, thereby forming a response signal 142a. The response signal 142a oscillates with the average frequency of the two vibration frequencies 122 and 132, and its amplitude envelope 143a varies according to the difference between the two frequencies 122 and 132. The amplitude envelope 143a causes the perception of "beats" and is a function of the fill level 140 of liquid 135 within container 110.

Figure 2C:
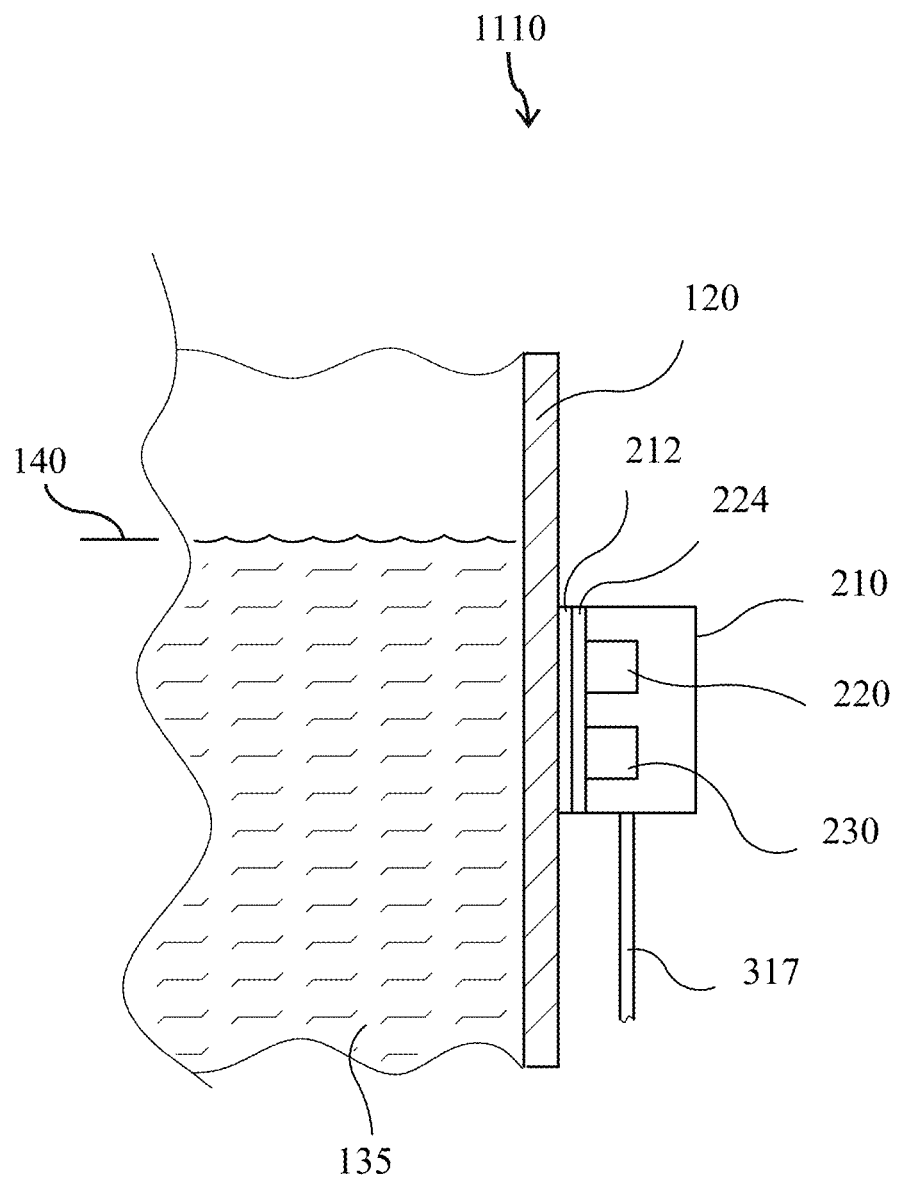
FIG. 2C is a cross sectional view of an illustrative single wall container fill level indicator secondary unit, with the secondary unit coupled to the outer surface of the container wall.
Figure 3B:
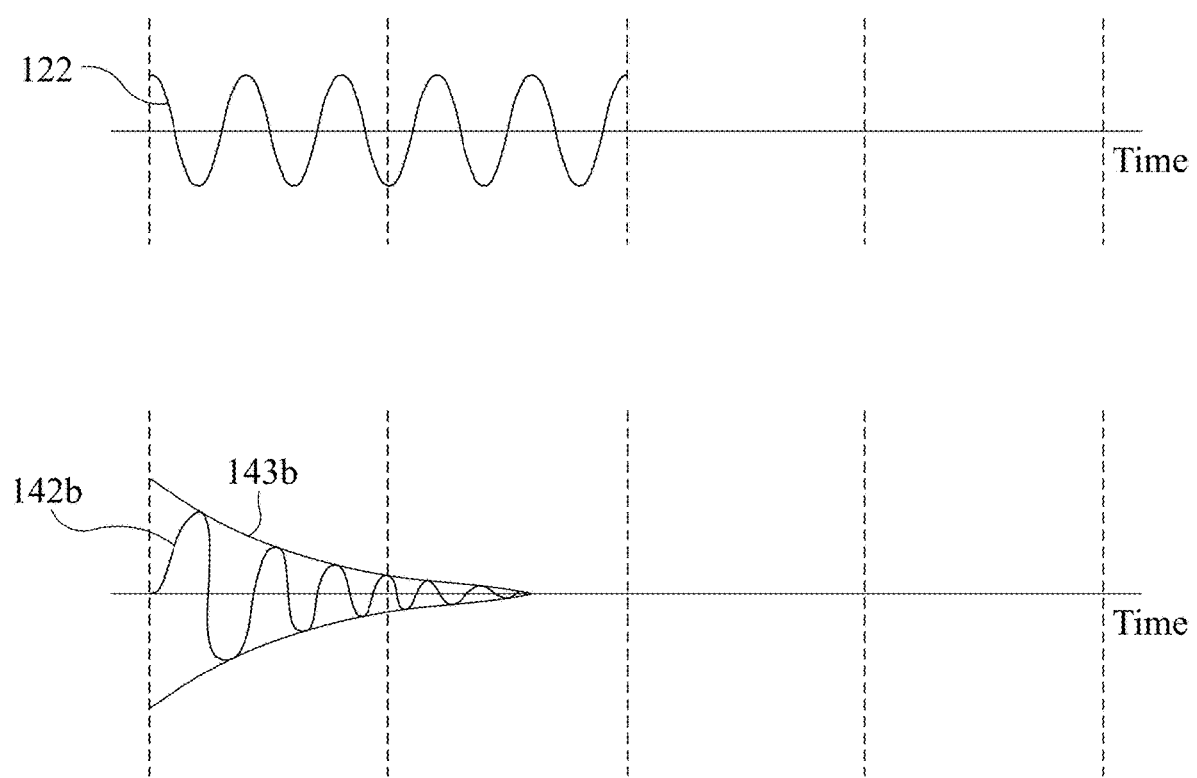
FIG. 3B is an illustration showing the resonant response of a single wall container and a resulting ringing decay of the amplitude envelope of the response signal.

In another embodiment according to the disclosure, as illustrated in FIG. 2C, the container 1110 can include a single wall 120 for storing liquid 135. Referring to FIG. 3B, a vibration (represented by a waveform/signal of the resonant frequency 122) induced in the single wall 120 will decay over a length of time dependent in part on the fill level of the container, as shown in the amplitude envelope 143b of the resulting response waveform/signal 142b. The frequency of the response signal 142b may also vary slightly from the resonant frequency 122 induced according to changes in the fill level 140 of the liquid 135 contained with the single wall. Variations in one or both of the decay time of the amplitude envelope 143b and frequency of the response signal 142b may be used to determine the fill level 140 for a single wall container. Optionally, a fill level system 150, including indicator 200, may be used for either single wall or double walled containers, or alternative embodiments of system 150 may be used and optimized for the particular container application.

Figure 4:
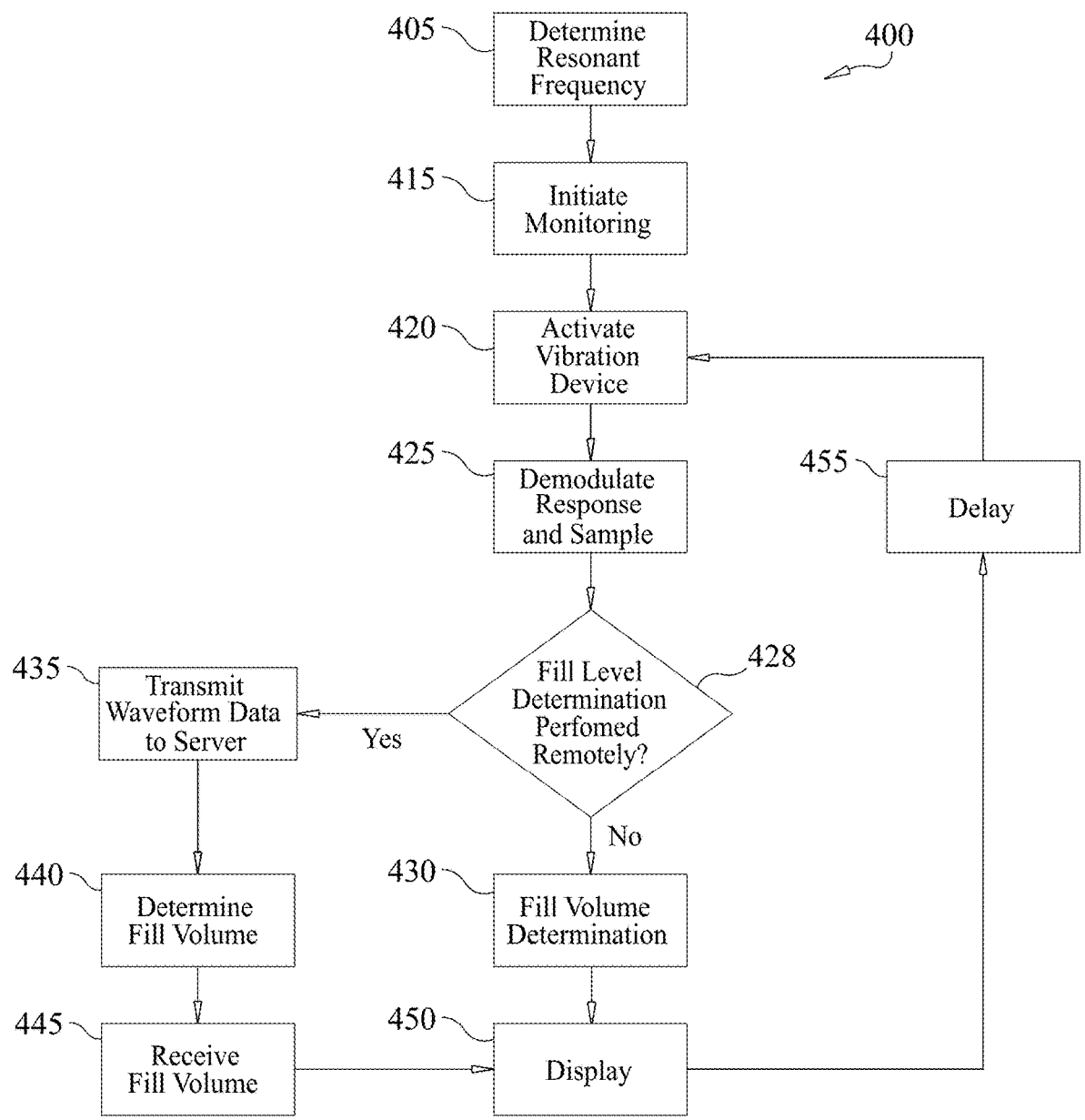
FIG. 4 is a process diagram of an illustrative embodiment of the container fill level measurement system according to the present disclosure.

FIG. 4 illustrates a process 400 for measuring a liquid level 140 within a container 110 including, for example, the steps of determining the constant resonant frequency of the outer wall 405, initiating monitoring of the container's fill level 415, activating the vibration device 420, measuring, demodulating, and sampling the response 425, determining whether the fill level will be determined remotely or on the local system 428 and, if it will be determined on the local system, determining fill volume 430, displaying the fill volume 450, and including some delay of time 455 prior to activating the vibration device 220 and repeating the fill level determination again.

Optionally, in one embodiment, the Step of determining the fill volume from the sampled fill level response data is completed remotely, for example by software on a remote server 380. In such an embodiment, after Step 428 the sampled fill level response data is transmitted 435 the remote server 380. In Step 440, the fill level is determined from the fill level response data. In Step 445, the fill level is transmitted from the remote server 380 back to the container fill level indicator 200.

Therefore, control and execution of one or more of the steps of process 400 can be implemented by the data processing device 330, for example, implemented by software associated with data processing device 330. Fill volume can be determined in Step 430 through the use of a stored lookup table, by using an equation or other algorithm, including using a machine learning algorithm such as an artificial neural network (ANN) model. For example, an ANN, such as a trained regression ANN, utilizing supervised, unsupervised, or semi-supervised machine learning techniques may be utilized. Alternatively, the processing of the data signal from the low frequency vibration detecting device 222, including determination of the volume of liquid 140 contained within the inner wall 130 can be performed in part or fully by the geographically remote server 380, which could also be equipped with a machine learning algorithm.

Figure 5:
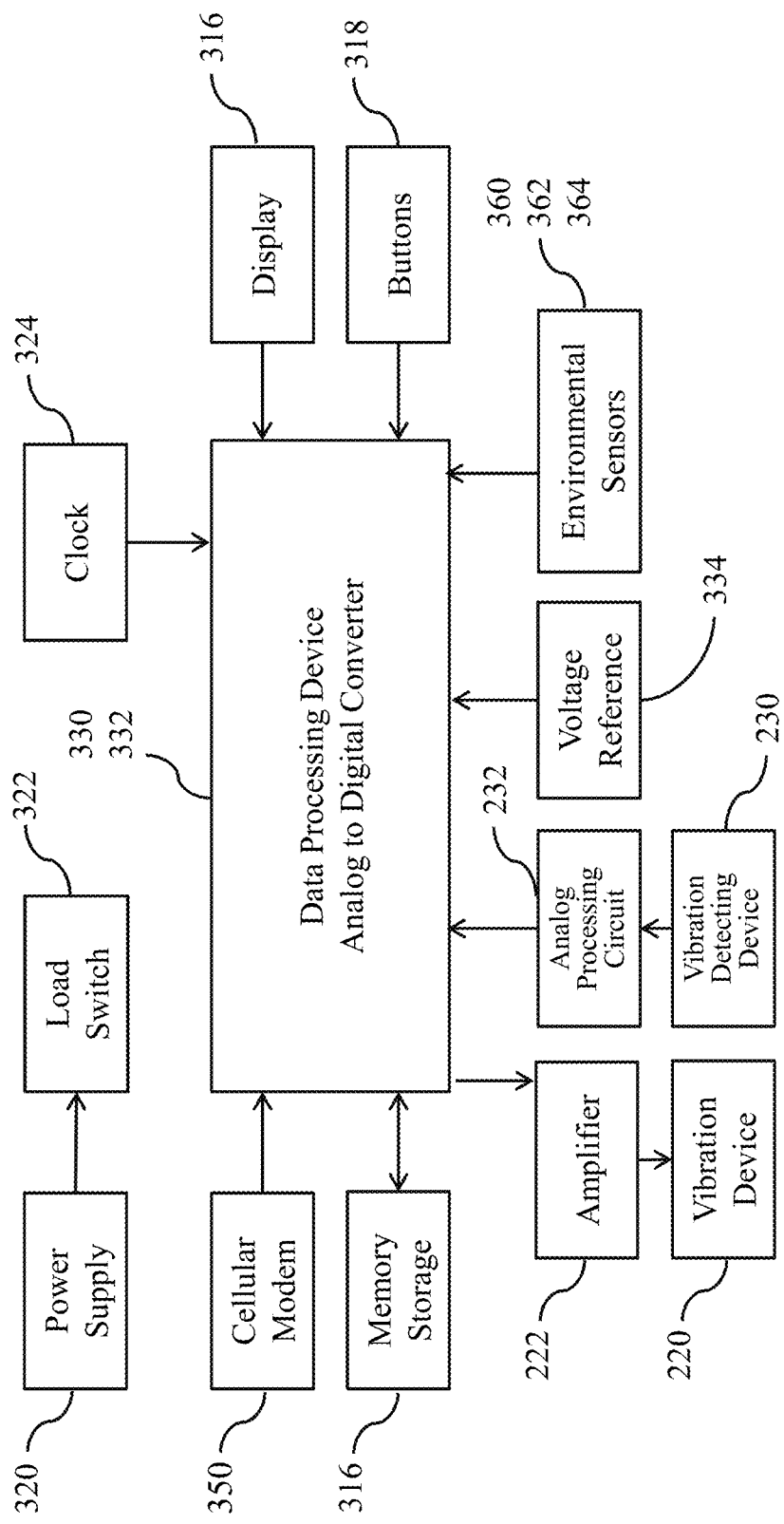
FIG. 5 is a block diagram of an illustrative embodiment of an illustrative container fill level indicator according to the present disclosure.

In an illustrative embodiment represented by a schematic diagram in FIG. 5, a load switch 322, such as a PFET Load Switch, part number TPS34082L, available from Texas Instruments of Dallas Tex., is used to switch the voltage from the power supply 132. Although any standard power supply 132 can be implemented, batteries are used as a power supply 132 in an illustrative embodiment, thereby eliminating the need for any additional power supply wiring. For example, lithium thionyl chloride batteries are advantageous based on a number of factors, including a wide range of temperature operation and a low self-discharge rate. However, lithium ion rechargeable batteries are also an attractive power supply 132 option, particularly given recent advances in lithium ion technology and decreasing self-discharge rates. Lithium ion rechargeable batteries are also particularly well suited to application in the present system due to their low impedance, ability to store large amounts of energy, and recharging capabilities.

In an illustrative embodiment, the wireless transceiver 350, such as a part number XB24C RF module available from Digi International Inc., can be turned on or off, as well as reset. The wireless transceiver 350 can be a cellular modem. Additionally, the wireless transceiver 350 can communicate with the server 380 via standard machine to machine protocol. In an illustrative embodiment, a MICROSD™ (trademark of SD-3C LLC of North Hollywood, Calif.) card is used for memory storage 340. Because the illustrative data processing device 330 is inexpensive and includes minimal on-board storage, information received by the wireless transceiver 350 may be stored in memory storage 340 and then loaded to the data processing device 330. Additionally, fill level data and other measurements can be stored in memory storage 340 to be transmitted at a later time. For example, battery 132 life can be conserved by taking multiple reading between transmissions and only utilizing the wireless transceiver 350 at specified intervals. Also, in the event that cellular or other communications fail, measurements can be stored and transmitted once wireless communication is restored.

In one embodiment the wireless transceiver 350 and remote server 380 use a UDP protocol to transmit data packets wirelessly over the Internet. UDP sockets provide IP and port addressing and data packet checksums, but advantageously minimize the amount of cell data and battery capacity used for communication since network connection, handshaking, and other data and battery consuming overhead are avoided with a connectionless UDP socket. The wireless transceiver 350 and remote server 380 can provide acknowledgement data packets and data packet sorting to ensure complete, ordered, and correct receipt of data transmitted. Compression of data packets can be used if the amount of data to be transmitted is sufficient to overcome compression overhead.

Environmental factors can affect the response signal 142a/b and thus, in an illustrative embodiment, the corresponding fill volume value for a given amplitude envelope signal 143a/b can be determined in light of environmental factors, including ambient temperature, humidity, and barometric pressure. An illustrative fill level indicator 200 also includes environmental sensors, including digital temperature 360, humidity 362, and barometric pressure sensors 364. An illustrative embodiment utilizes a miniature inter-integrated circuit (I²C) digital barometer 364 such as part number MPL140A2, available from Freescale Semiconductor of Austin, Tex., and a Si7021-A20 I²C humidity sensor 362 and temperature sensor 360, available from Silicon Labs of Austin, Tex. In the illustrative embodiment, three additional data samples, one each for temperature, humidity, and pressure are added to the 384 fill level data samples during each fill level measurement.

A display screen 316, such as an organic electroluminescence (OEL) display module, for example, part number UG-2864HSWEG01 available from Univision Technology Inc. of Chunan, Taiwan, provides a visual output interface. One or more buttons 318, such as pushbutton power switches, part numbers PV5S64012 and PV5S64017 available from Digi-Key of Thief River Falls, Minn., provide an input interface. Alternative user interfaces known in the art can be used additionally or alternatively.

In an illustrative embodiment, battery life is preserved by utilizing low-power usage components and component sleep states to minimize circuit current and circuit current draw in a sleep state. The battery of an illustrative embodiment is intended to last multiple years, thereby minimizing the need for gas supply drivers to change or replace batteries. In an illustrative embodiment, the wireless transmission device consumes the most power and thus the transmission of wireless reports is performed as infrequently as possible, dependent upon the rate of level change in the container. In an illustrative embodiment, only the data processing device 330, including analog to digital converter 332, the clock 324, and the buttons 316 have a direct connection to the power supply 320, i.e. are powered all of the time. The remaining components are disconnected from the power supply 320 when not in use by the load switch 322 in order to preserve battery power.

In regard to hardware implementation and circuitry associated with illustrative embodiments, it is important to note that the same functionality can be accomplished at least in part with software, as will be apparent to one of ordinary skill in the art. In other words, a more expensive processor can accomplish features that would otherwise be implemented with additional circuitry. Additionally or alternatively, in regard to software implementation and the processor and other hardware associated with illustrative embodiments, it is noteworthy that the same functionality can be accomplished at least in part with hardware, as will be apparent to one of ordinary skill in the art, though at a potential cost or other advantage or disadvantage.

As shown in FIGS. 6A, 6B, 7A and 7B, an illustrative embodiment of the fill level indicator 200 separates the main housing 310 of the data processing device 330 from the sensor housing 210 to minimize any damping effect on the low frequency detecting device 222; i.e. the main unit 222, including the power supply 132, may be heavy enough to dampen the vibratory signal of the vibration device 220 and the resultant response signal 142a detected by the low-frequency vibration detecting device 222 if the vibration device 220 and low-frequency vibration detecting device are incorporated into the main housing 310. Additionally, the main housing 310 of an illustrative embodiment is adapted to fit on the handle 112 of a commercial container 110 such that a recessed portion 312 in the back of the main housing 310 mates to the handle 112 of the container 110. This allows the main housing 310 to be easily attached to the handle 112 of the container 110 by utilizing simple attachment bands or clamps 314.

In an illustrative embodiment, the sensor housing 210 is separate from the main housing 310, including only the vibration device 220 and vibration detecting device 222. This keeps the mass of the sensor 210 low, such that the excitations from the vibration device 220 inducing resonant frequency 122 and 132 and response signal 142a detected by the vibration detecting device 222 are not damped or affected by the mass and weight of the main unit 310. The sensor 210 of an illustrative embodiment is outdoor rated and can be attached to the surface of the outer wall 120 of the container 110 by utilizing double-sided tape or some other adhesive 212.

Because containers are often located outside or subjected to adverse conditions, the housings 210/310 of an illustrative embodiment are outdoor-rated such that they are capable of withstanding snow, rain, and wind. This entails the gasketing of all device openings, seams, and connections. Specifically, an illustrative embodiment is dustproof and waterproof; i.e. can withstand the effect of immersion in water between 15 centimeters and 1 meter, but cannot withstand long periods of immersion under pressure, for example, IP67 rating, or can withstand sprays of water but not immersion, for example, IP65 rating.

Figure 6A:
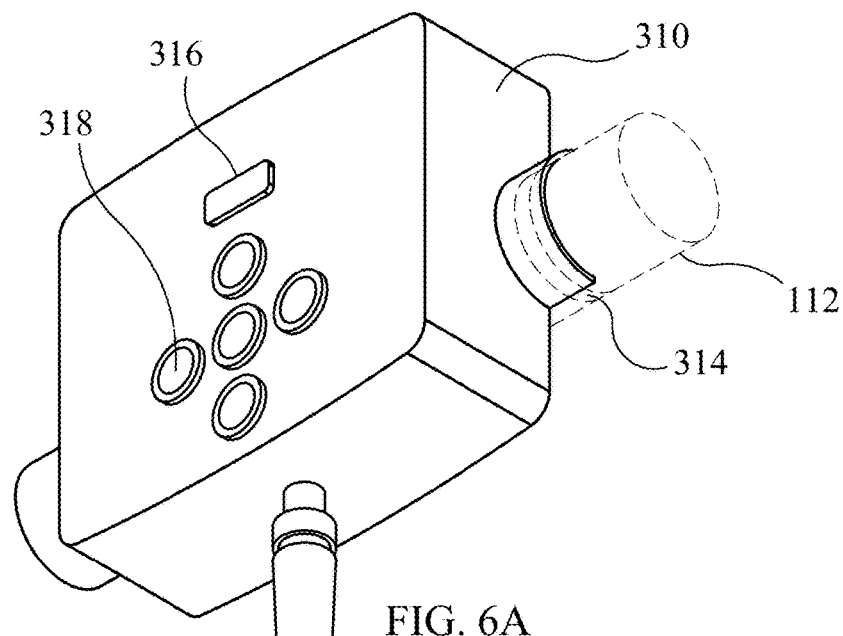
FIGS. 6A and 6B are a front view and a rear view, respectively, of an illustrative container fill level indicator main unit according to the present disclosure.
Figure 6B:
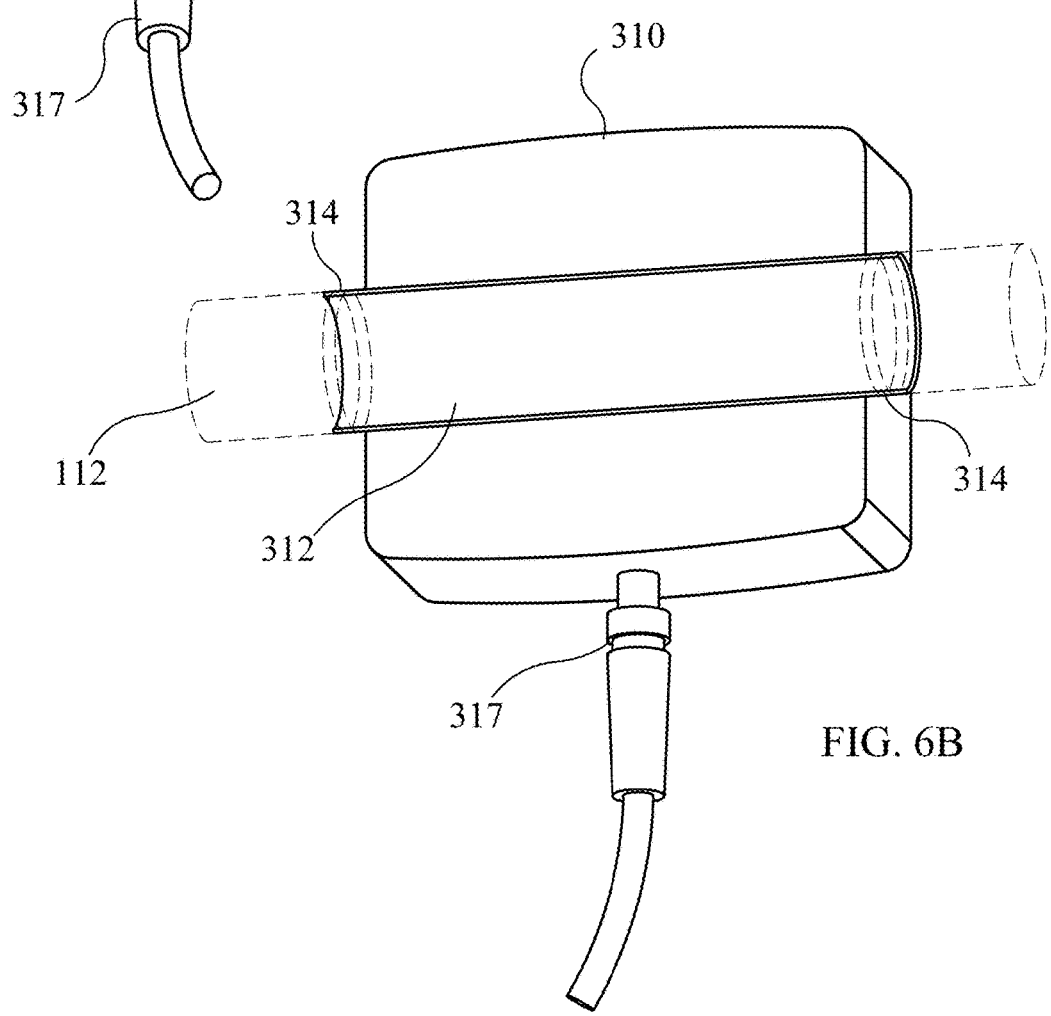
Figure 8:
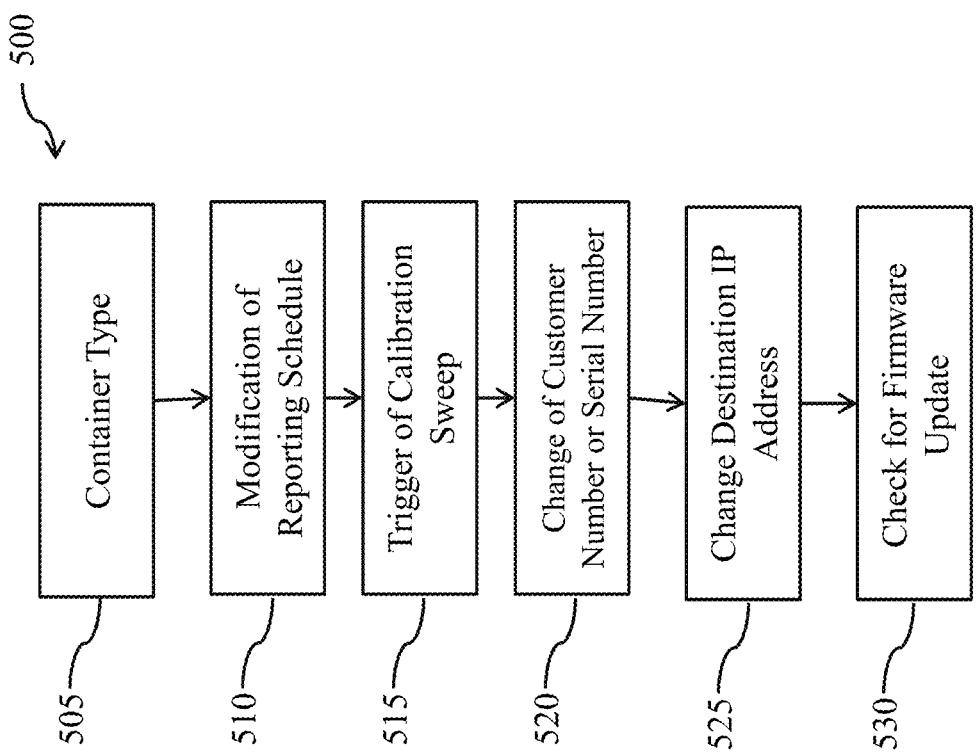
FIG. 8 is a process diagram of an illustrative embodiment of the fill level indicator main unit menu according to the present disclosure.

Referring to FIG. 6A, an illustrative embodiment can consist of buttons 318 arranged in a cross shape, such that there are center, top, bottom, left, and right buttons. However, any number of other interface components could be utilized, including touchscreens, wireless connections, or remote displays. In an illustrative embodiment, pressing the center button initiates display of a container-level indication on the display 316. If no additional buttons are pressed, the display times out and turns off after a preset number of seconds, for example, 3 seconds. However, pressing the center button a second time before the display times out initiates display prompting the user for a password. The user then inputs a number of alphanumeric characters, for example four characters, as a password to gain access to a device menu process 500, as shown in FIG. 8. In an illustrative embodiment the menu 500 enabled by software and hardware associated with the fill level indicator 200, including data processing device 330. Additionally or alternatively, menu 500 may be enabled by remote monitoring system 380. The menu 500 includes settings for container type 505, modification of reporting schedule 510, trigger of calibration sweep 515, change of customer number or serial number 520, change destination IP address 525, and check for firmware update 530. The selectable items of menu 500 may be displayed or selected in any order and the significance of and processes for some of the selectable items of menu 500 are discussed further below.

Figure 9:
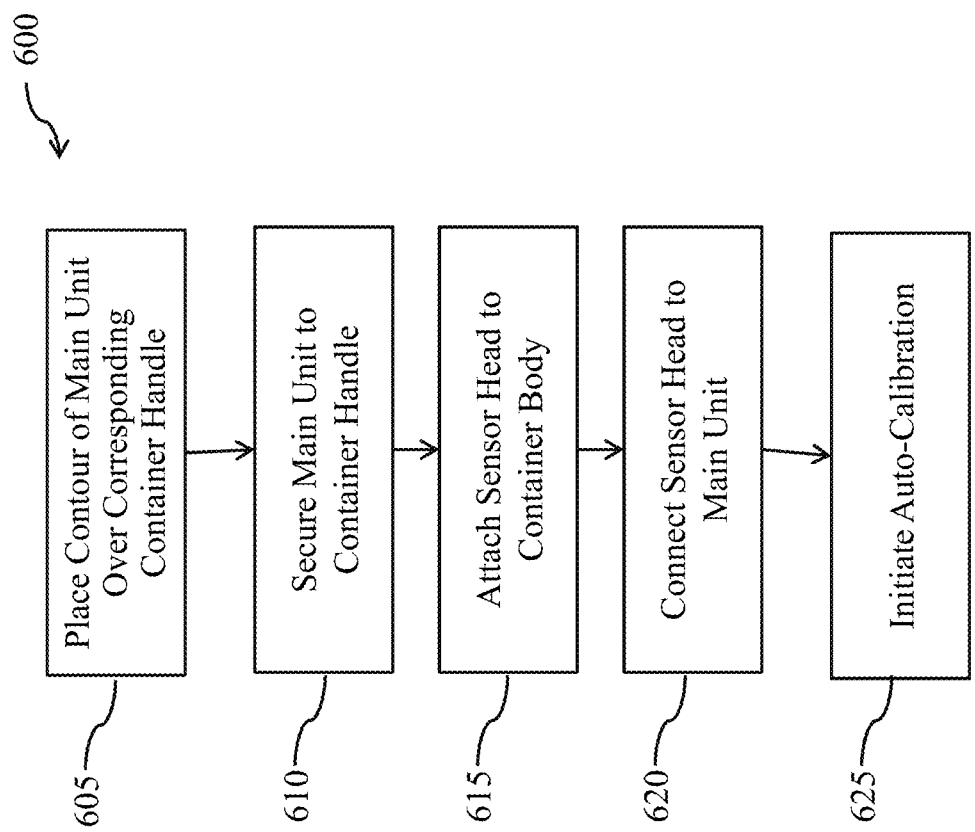
FIG. 9 is a process diagram of an illustrative embodiment of the installation method according to the present disclosure.

An illustrative installation method 600 (as shown in FIG. 9) of the fill level indicator 200 of the present disclosure provides a significant benefit over the prior art. A known alternative method of identifying container level required placing scales under the container 110 and communicating with the scales to determine volume based on weight. However, scales that can accurately measure the weight of a full container 110 are cost prohibitive and difficult to install because the container must be lifted onto the scale. In an illustrative embodiment shown in FIGS. 6A and 6B, the main unit mounting contour 312 matches the container handle 112 and the main unit housing 310 can be placed 605 over the handle 112. In securing Step 610, attachment bands 314, for example, adjustable clamps, ties, or a tape, or other circumferential securing devices can then be tightened over the contour 312 and handle 112 of opposing sides of the main unit housing 310, securing the main unit housing 310 to the handle 112. The sensor housing 210 is then attached in Step 615 to the outer wall body 120 using pre-installed double sided tape or similar adhesive 212. This allows the fill level indicator 200 to be installed quickly and efficiently by supplier drivers or other users. The sensor housing 210 can then be coupled 620 to the main unit 310 via a wired connection 317 or, alternatively, may wirelessly communicate with the main unit. Once the unit is installed on the container 110 at Step 625, the driver initiates an auto-calibration process 700.

Figure 10A:
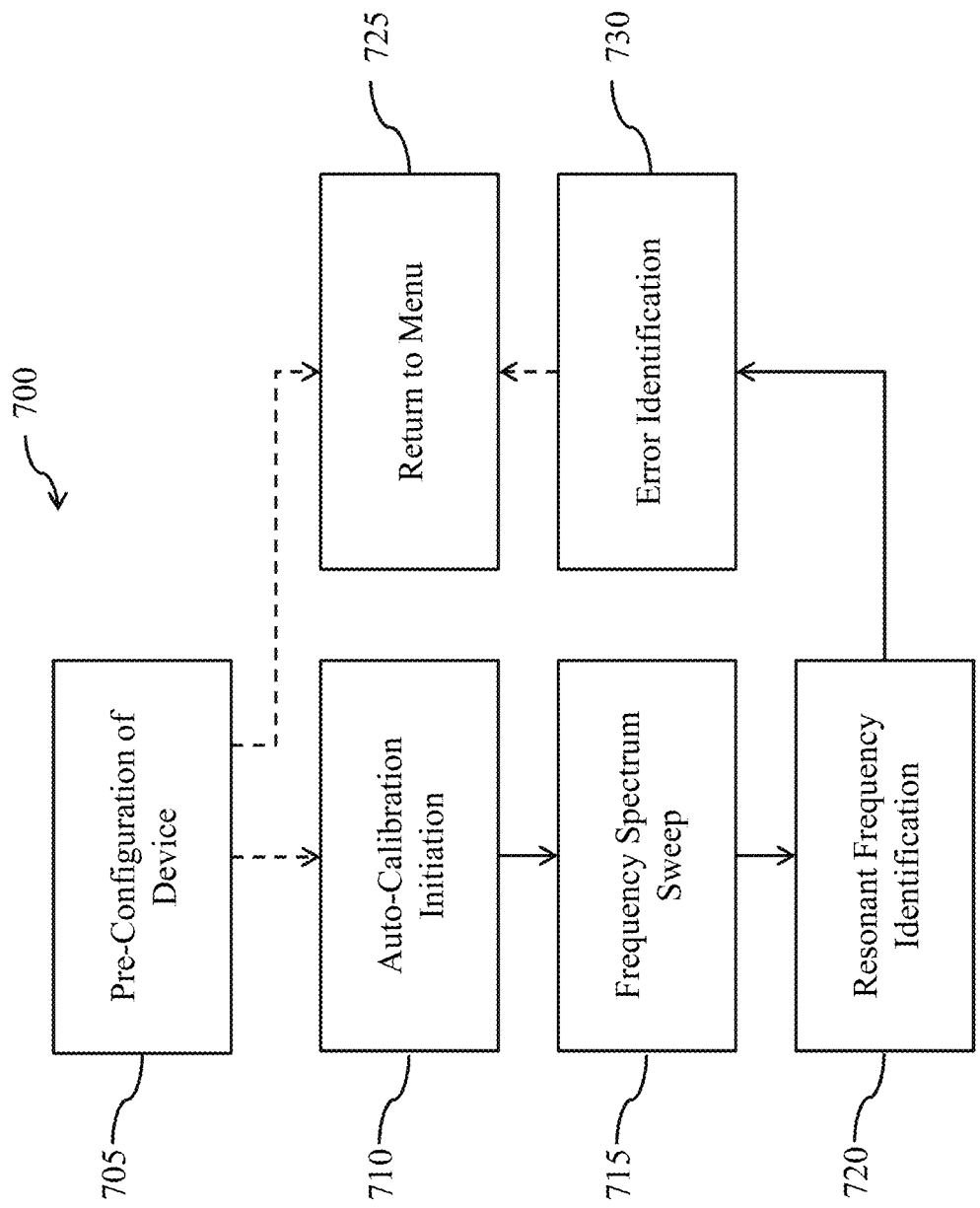
FIG. 10A is a process diagram of an illustrative embodiment of the auto-calibration method according to the present disclosure.

As shown in FIG. 10A, an illustrative auto-calibration process 700 is enabled by software and hardware associated with the fill level indicator 200, including data processing device 330. Additionally or alternatively, process 700 may be enabled by remote monitoring system 380. According to the present disclosure, auto-calibration process 700 includes pre-configuration of device in Step 705, auto calibration initiation 710, frequency spectrum sweep 715, resonant frequency identification 720, error identification 730, and return to menu 725. Typically a device would be pre-configured 705 to facilitate a quick installation process 600 in the field. If the device has not been pre-configured, the installer will be prompted, or otherwise have the option, to select the container type from the menu at Step 725. Given that a particular container's resonant frequency 122/132 can vary by a few Hz, the vibration device 220 pings the outer wall 120 at a preconfigured range of frequencies to identify the outer wall's particular resonant frequency 122. The frequency range of the vibration device's frequency sweep is determined in Step 715 based on the container type, including size, shape, or model of the container 110, e.g. a typical sweep may range from 10% below the container type's usual resonant frequency to 10% above the container type's usual resonant frequency.

As an example, if a particular container type's resonant frequency for the outer wall 120 is typically 200 Hertz, the transducer's spectrum sweep may range from 180 to 220 hertz. Even when the resonant frequency 122 for a particular manufacturer's model of a container 110 is known, resonant auto-calibration process 700 still can be important as variations in resonant frequency even within a particular container 110 model are known to exist. For example, sometimes a thicker material for walls 120 and 130 is substituted to circumvent a temporary material shortage. Additionally, a particular installation of a container 110 can influence resonant frequency, including, for example, securing/mounting of the body of the container 110 to another structure.

Once identified, the resonant frequency 122 is stored and future excitation of the container is performed at the particular container's resonant frequency. If the resonant frequency identification Step 720 fails, i.e. the system cannot identify the resonant frequency within the spectrum range of the frequency sweep, the installer is notified via an error message 730 and prompted to select the container type from the menu at Step 725 before the frequency sweep 715 is performed again. Other possible errors that can result in error message 730 include contact between the container and one or more other objects, thus dampening the vibration signal applied to the outer wall 122 and/or the resultant response signal 142*a*.

Figure 10B:
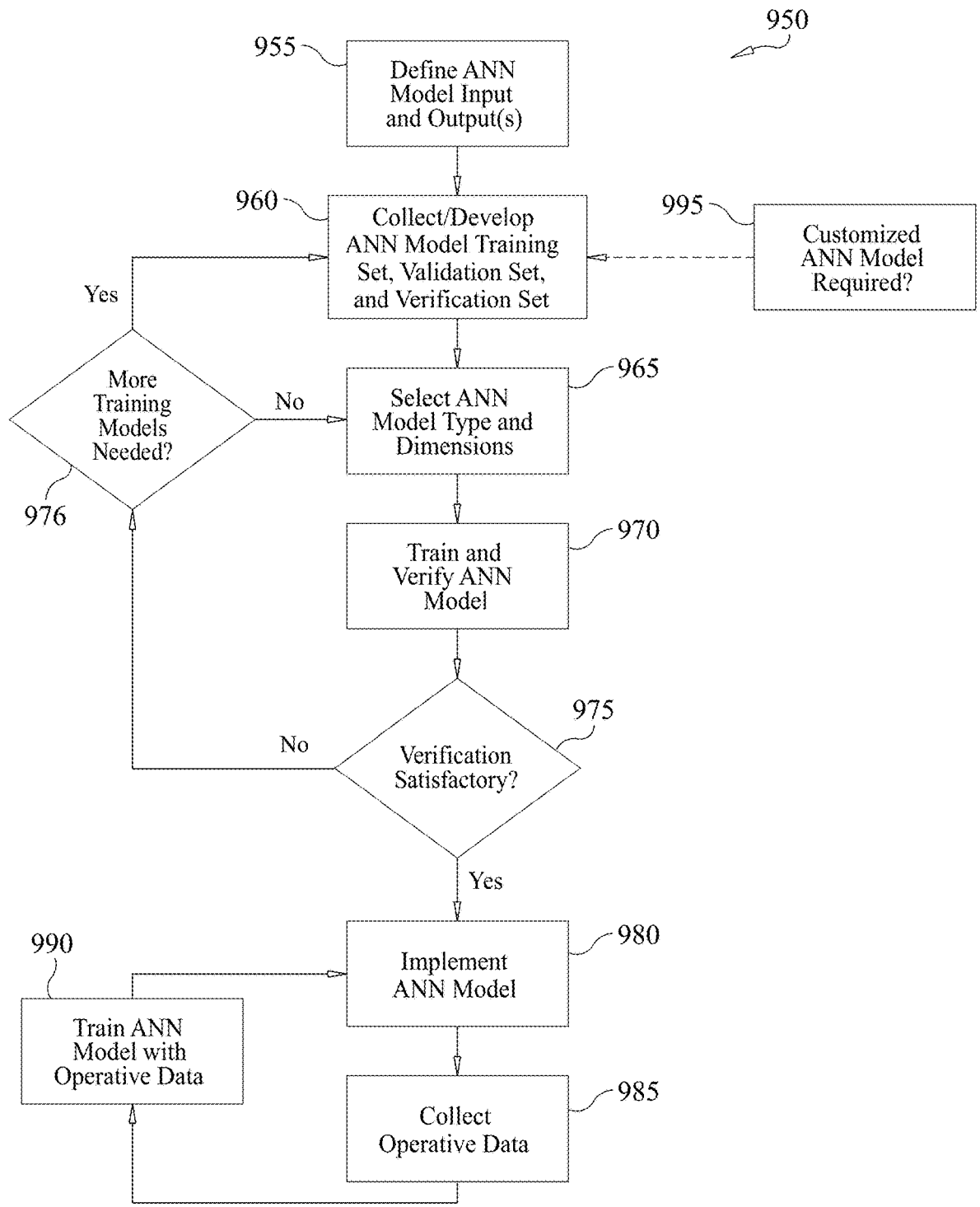
FIG. 10B is a process diagram of an illustrative embodiment of a machine learning algorithm determination method according to the present disclosure.

FIG. 10B shows an illustrative process 950 to implement a machine learning algorithm, more specifically an artificial neural network (ANN) model, in one illustrative embodiment of system 150 using machine learning to train the ANN model to determine the liquid fill level in a container. The ANN model can use fill level response data samples and optionally one or more samples of environmental data to determine and output a fill level.

The ANN model can be hosted by the remote server 380, a cloud or other server (not shown), or by the data processing device 330. Advantageously, by locating the ANN model on a remote server 380, costs of added memory and/or a more complex processor, and associated battery usage in using the ANN model to determine the fill level can be avoided for each fill level indicator 200 of the system 150. Additionally, continuous or periodic improvement of the ANN model can more easily be done on a centralized server 380 and avoid data costs, battery usage, and risks of pushing out a firmware update of the ANN model to each fill level indicator 200. A remote server 380 may also serve as a central repository storing training and/or collections of operative data sent from various fill level indication systems to be used to train and develop ANN models for existing or future fill level indication systems or related applications. For example, a growing repository of data can be used to update and improve ANN models on existing systems and to provide improved models for future systems or related applications.

An exemplary commercially available software to implement the process 950 is Keras (available on the Internet at Keras.io), an open source ANN model library that runs on top of either TensorFlow or Theano, which provide the computational engine required. TENS ORFLOW (an unregistered trademark of Google, of Mountain View, Calif.) is an open source software library originally developed by Google of Mountain View, Calif. and is available as an internet resource at www.tensorflow.org. Theano is an open software library developed by the Lisa Lab at the University of Montreal, Montreal, Quebec, Canada, and is available as an internet resource at deeplearning.net/software/theano/.

In Step 955, the ANN model input and output layers are selected—that is, the number of data points in each of the input and output layers which will be separated in the ANN model by one or more layers of neurons. Any number of input and output data points can be utilized for the input and output layers. In one illustrative embodiment there can be, for example, 387 data inputs and one data output, a percentage for fill level in the container (shown in FIG. 10C). In the illustrative body, the inputs can be structured to represent 384 digital samples of the analog amplitude envelope 243*a/b* and three measured environmental variables: temperature, pressure, and humidity. The machine learning algorithm may be structured such that more or less input response samples and/or environmental samples can be utilized.

In Step 960, an ANN model training data set is developed and/or collected for use in the current machine learning application. A generally accepted practice is to divide the model training data sets into three portions: the training set, the validation set, and the verification (or "testing") set. The training set is used to adjust the internal weighting algorithms (shown in FIG. 10C) and functions of the hidden layers of the neural network so that the neural network iteratively "learns" how to correctly recognize and classify patterns in the input data. The validation set, however, is primarily used to minimize overfitting. The validation set typically does not adjust the internal weighting algorithms of the neural network as does the training set, but rather verifies that any increase in accuracy over the training data set yields an increase in accuracy over a data set that has not been applied to the neural network previously, or at least the network has not been trained on it yet (i.e. validation data set). If the accuracy over the training data set increases, but the accuracy over then validation data set remains the same or decreases, the process is often referred to be "overfitting" the neural network and training should cease. Finally, the verification set is used for testing the final solution in order to confirm the actual predictive power of the neural network.

In one illustrative embodiment, approximately 70% of the developed or collected data model sets are used for model training, 15% are used for model validation, and 15% are used for model verification. These approximate divisions can be altered as necessary to reach the desired result. The size and accuracy of the training data set can be very important to the accuracy of the ANN model developed by process 950. For example, for an illustrative embodiment of system 150, about 30,000 sets of data may be collected, each set including a higher sampling rate and/or bit resolution for the amplitude envelope 243 *a/b*, environmental data samples, and precise determination of fill level by weighing. The training data set may include samples throughout a full range of expected fill levels and environmental and other ambient conditions.

Further, as shown in Step 995, specifically tailored data sets can be collected to train containers with known or relatively known properties (e.g. specific container models, styles, dimensions, and/or applications) to ensure the internal weights of the neural network are more appropriately trained such that the container is more accurate during its initial deployment. For example, once enough data is collected from a large number of deployed containers, the data can be classified based upon the model of container it was collected from. When training ANN models for future container applications, the specific training data set for that container model can be applied to increase the initial accuracy of the container. The remote server 380 may serve as a central repository to store and classify this data collected from a vast database of container types and unique fill level applications such that it can be used to locally or remotely develop, train, or retrain ANN models for existing or future fill level indication systems or related applications.

Figure 10C:
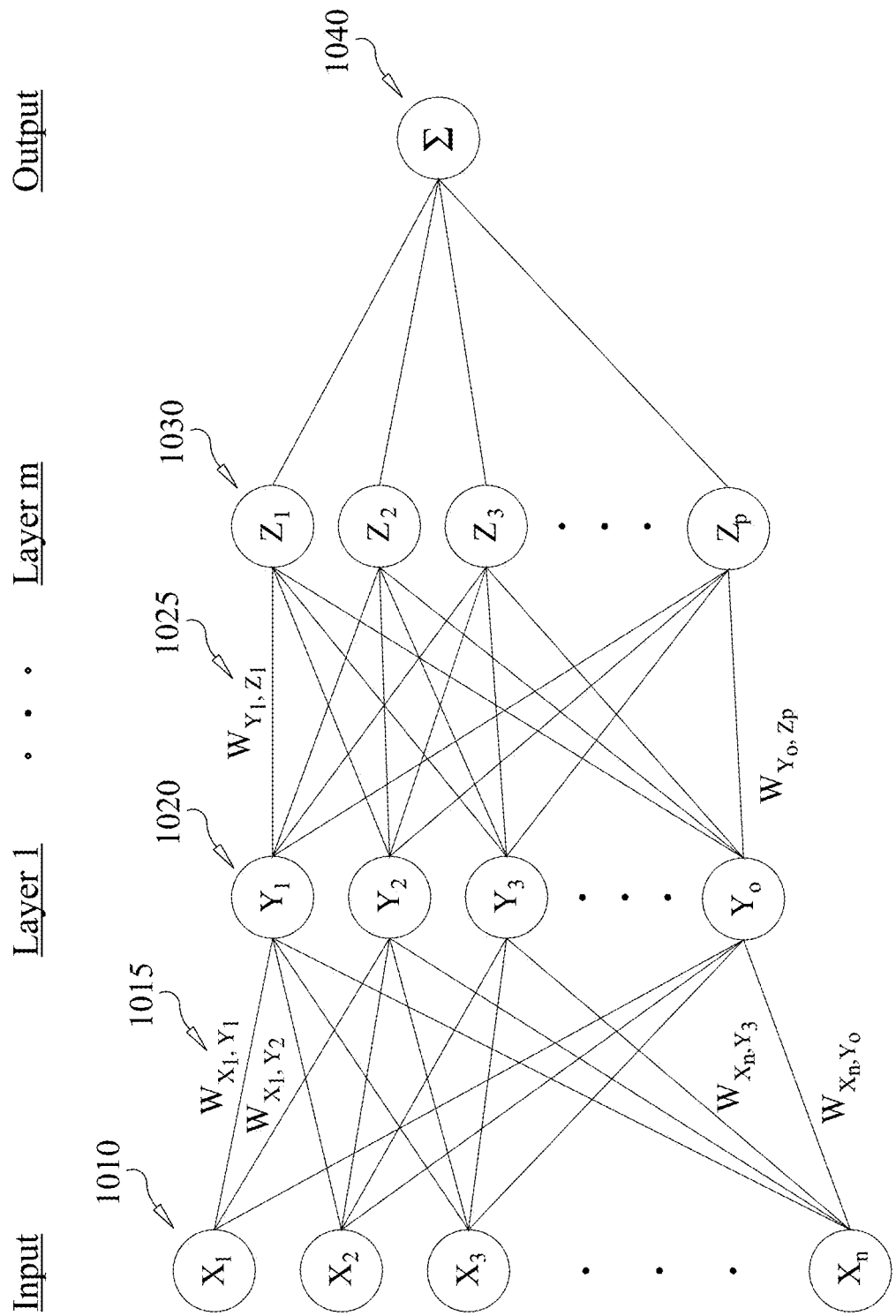
FIG. 10C is a diagram of an illustrative embodiment of a machine learning algorithm according to the present disclosure.

In Step 965 of an illustrative embodiment, and with continued reference to FIG. 10C, a regression ANN model with one input layer 1010, two hidden layers 1020,1030, and one output layer 1040 is selected, although any type of ANN model and any number of layers, particularly any number of hidden layers, may be utilized. The first layer can have 200 neurons and the second layer can have 100 neurons; however, a higher or lower number of layers and neurons in each layer can be used to achieve a desired memory and computational time and other processing requirements and a desired accuracy of the fill level output. For instance, in a second embodiment, a first layer of the ANN could have 100 neurons, a second layer could have 50 neurons, and a third layer could have 50 neurons. Optionally, the process 950 can be tailored for a selected number of different ANN model types and/or dimensions to compare the accuracy and select a preferred ANN model for any particular container or related application. Guidelines known to those skilled in the art and/or associated with specific ANN model software can aid in the initial selection of the model type and dimensions.

In Step 970, the ANN model software is pointed to the training and validation portions of the training data set. Training is an iterative process that sets the internal weights, or weighting algorithms 1015, 1025, between the ANN model neurons, with each neuron of each layer being connected to each neuron of each adjacent layer, and further with each connection represented by a weighting algorithm. With each iteration of training data to adjust the weights, the validation data is run on the ANN model and one or more measures of accuracy is determined by comparison of the model output for fill level with the actual measurement of fill level collected with the training data. For example, generally the standard deviation and mean error of the output will improve for the validation data with each iteration and then the standard deviation and mean error will start to increase with subsequent iterations. The iteration for which the standard deviation and mean error is minimized is the most accurate set of weights for that ANN model for that training set of data.

In Step 975, the ANN model software is pointed to the verification data set and a determination of whether the output of the ANN model is sufficiently accurate when compared to the actual fill level measure with collection of the data. If the accuracy is not sufficient, process 950 can continue at Step 980 or Step 976 if any additional training models are needed. The process 950 is continued at Step 976 if the ANN verification was unsatisfactory, and it may be desirable to return to Step 960 to collect a larger and/or more accurate set of training data to improve ANN model accuracy. The process is continued at Step 965 if it is desired to try to improve ANN model accuracy using the current training data set by selecting an ANN model of a different type and/or dimensions.

Once the ANN model has been selected and trained to sufficient accuracy, in Step 980 the ANN model is implemented. For example, in an illustrative embodiment, the ANN model is hosted in software form by the remote server 380. Alternatively, the ANN model could be hosted in hardware form and/or could be hosted by the data processing device 330 of the fill level indicator 330, optionally with a wireless data connection to the remote server 980 to receive updates or modifications to the locally-hosted ANN if necessary.

Optionally, the ANN model can be improved over time with additional data. For example, in Step 985, operational data (e.g., collections of amplitude envelope 143*a/b*, environmental, and actual fill level data) can be collected from the individual tank and, in Step 990, used to further train and improve the ANN model for any particular container or application, essentially growing the aggregate training data set over time. This operational data can be compiled from a number of sources, including from the historical data the tank itself has produced or from similar tanks used in similar environments. This method of training fine-tunes the accuracy of the ANN since the ANN is receiving data specifically produced by the tank it serves or from similarly situated tanks.

One illustrative method of gathering this operational data is from the individual drivers in the field who are deployed to periodically fill up the tanks. Once a driver is on-site with the tank and fills the tank to 100% capacity, an accurate set of data can be obtained and the levels of the tank can be monitored moving forward. Subsequently, an increased rate of container fill level data acquisition per day can be configured such that the system collects a large volume of data consisting of many sampled vibration response signals. Each time the driver subsequently returns to the tank to refill it, the collected data can be analyzed to confirm the ANN model output readings versus how much liquid was filled in the tank by the driver. After repeating this process through multiple container refills, the ANN model serving that particular tank will collect enough verified data to be used to further train the ANN model and become smarter as machine learning is being advanced in each instance. For that reason, it can be found advantageous to initiate container fill readings on a more frequent basis (e.g. once or twice per hour) immediately following installation, before backing down the readings to a more infrequent basis (e.g. once or twice per day) once the ANN model learns how to provide the most accurate readings.

Optionally, in Step 995, the aforementioned operational data or separately collected set of test data for a particular installation, container model, or other varying condition can be used to select and train a specific and custom ANN model for its particular set of conditions. For example, if two different containers 110 vary significantly in mechanical design and configuration, it is likely that a separate set of training data and a separate ANN model would need to be developed for each type of container. For example, it is likely that a different set of training data and ANN model would need to be developed by process 950 for single wall and double wall containers. Additionally or alternatively, it maybe that a particular ANN model is reasonably accurate for a range of resonant frequencies 122, but not for all possible resonant frequencies.

Figure 11:
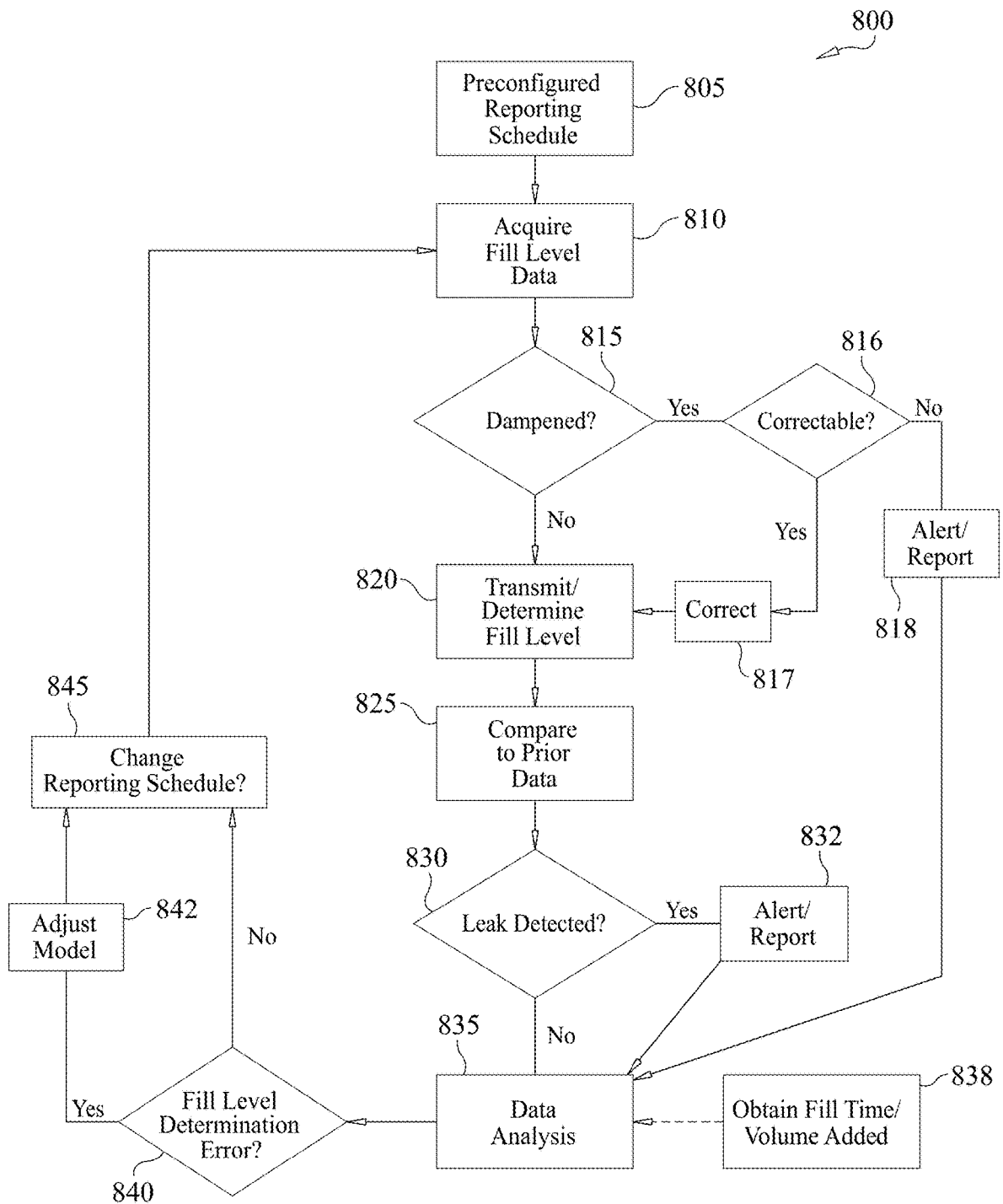
FIG. 11 is a process diagram of an illustrative embodiment of a data monitoring and reporting method according to the present disclosure.

As shown in FIG. 11, the steps of an illustrative data reporting and trending process 800 are enabled by software and hardware associated with the fill level indicator system 150, including data processing device 330 of indicator 200 and additionally or alternatively, remote monitoring system 380. The illustrative data reporting and trending process 800 can begin with a preconfigured reporting schedule 805. A once per day reporting schedule is typical for taking fill level data acquisition readings 810, however the reporting schedule may be modified for many reasons as indicated herein, such as being increased during a period of time upon initial deployment. Next, the system can be configured at Step 815 to first process the fill level response data to determine whether the fill level response signal is dampened. For example, this determination may be done in one regard by simply comparing the resonant response frequency to historical resonant response frequencies, or by comparing the first derivative of prior and most recent responses, or by noting a sudden change in the decay rate of the amplitude of the response. A signal may become dampened, for instance, by an object being place up against the outer wall of the tank. If the signal is found to be dampened, the system can be configured, at Step 816, to determine whether the dampened signal is correctable or, optionally, whether the machine learning algorithm can be adjusted to account for the dampened signal. If so, the signal is corrected at Step 817 and the process continues normally at Step 820. However, if the dampened signal is not determined to be correctable, the system can be configured to alert or report the dampened signal error to a user at Step 818 before proceeding ahead in process 800 to the data analysis at Step 835.

If the signal is not found to be dampened, or has been corrected, process 800 can continue to Step 820 to determine the fill level. This step optionally may require the transmittal of the signal to the remote server for processing if the processing is completed remotely. Optionally, if a transmission fails at Step 820, the fill level indicator system 150 may attempt to retry transmitting the fill level data with a time delay between transmissions. For example, a failed transmission may result in the data being stored and then four subsequent transmission attempts at Step 820 may be made. If a requisite number of transmission attempts 820 take place with no success, the fill level indicator 200 will attempt to transmit the stored reading per the next normal operation according to the reporting schedule.

Once the signal has been processed, at Step 825, the system can compare the fill level measurement to a prior-recorded or historical fill level measurement to determine whether there exists a leak in the container, at Step 830. Leak detection analysis can also be performed by the indicator 200 or by the remote monitoring system 380 level. Container systems often include multiple opportunities for leaks, such as hoses and junctions. Given that gases in a liquid state go straight to a gaseous state, leaks cannot be detected by simple methods such as examining lines for leaking fluid. Step 830 of the data reporting and trending process 800 inherently includes steps for leak detection fill level readings and identification of a leak, before finally proceeding to the alerting and reporting of a leak detection at Step 832. In an illustrative embodiment, leaks are identified by measuring the fill level 140 over a period of time delay 837 while the container is not being used, e.g. during the late night hours. A leak is determined based on a delta in the fill level measurements 845. The requisite delta is specific to the container size and type. For example, if the measurements of an approximately 273 pound empty and approximately 750 pounds full container are taken four hours apart and there is a delta of 4 pounds, a pound an hour is being lost and thus there is a leak in the container system. Given that wireless transceiver 350 usage plays a significant role in diminishing battery life, battery life is preserved by not sending out leak measurement data unless a leak is identified in Step 830. If a leak is detected at Step 830, then the cell modem can be activated and an alarm message can be sent to the remote monitoring system 380 in Step 832. The alarm message ultimately can be sent out to the drivers and manager or supervisor of the fill supplier.

The illustrative process 800 proceeds with analysis of the data 835 (shown in FIG. 12) by the processing device, optionally obtaining fill time and volume added by a driver 838 as discussed herein. The process then proceeds to fill level determination error checking 840. Fill level determination error checking can be done by comparing or otherwise analyzing the fill level determined in process 400 (also reflected in steps 810 and 820) with information obtained by a route driver who fills containers, for example, fill time, volume added, and fill level determined by other means, for example, a mechanical gauge. If an error is found in the data, the ANN model may optionally be adjusted at Step 842 if it is determined that corrections to the model may yield more accurate results. Whether or not the model is adjusted, it may be necessary to change the rate of data reporting, at Step 845. The rate of reporting can be increased or decreased based on usage. For instance, the reporting schedule can be changed based on usage to preserve battery life, e.g. if the usage rate decreases, the frequency of reporting can also decrease. Reporting 815 may also include other recorded measurement and time stamps, such as data recorded during a leak check 840/845. Additionally, the remote monitoring system 380 of an illustrative embodiment can push a new configuration down to the indicator 200 with a changed reporting schedule 845.

Figure 12:
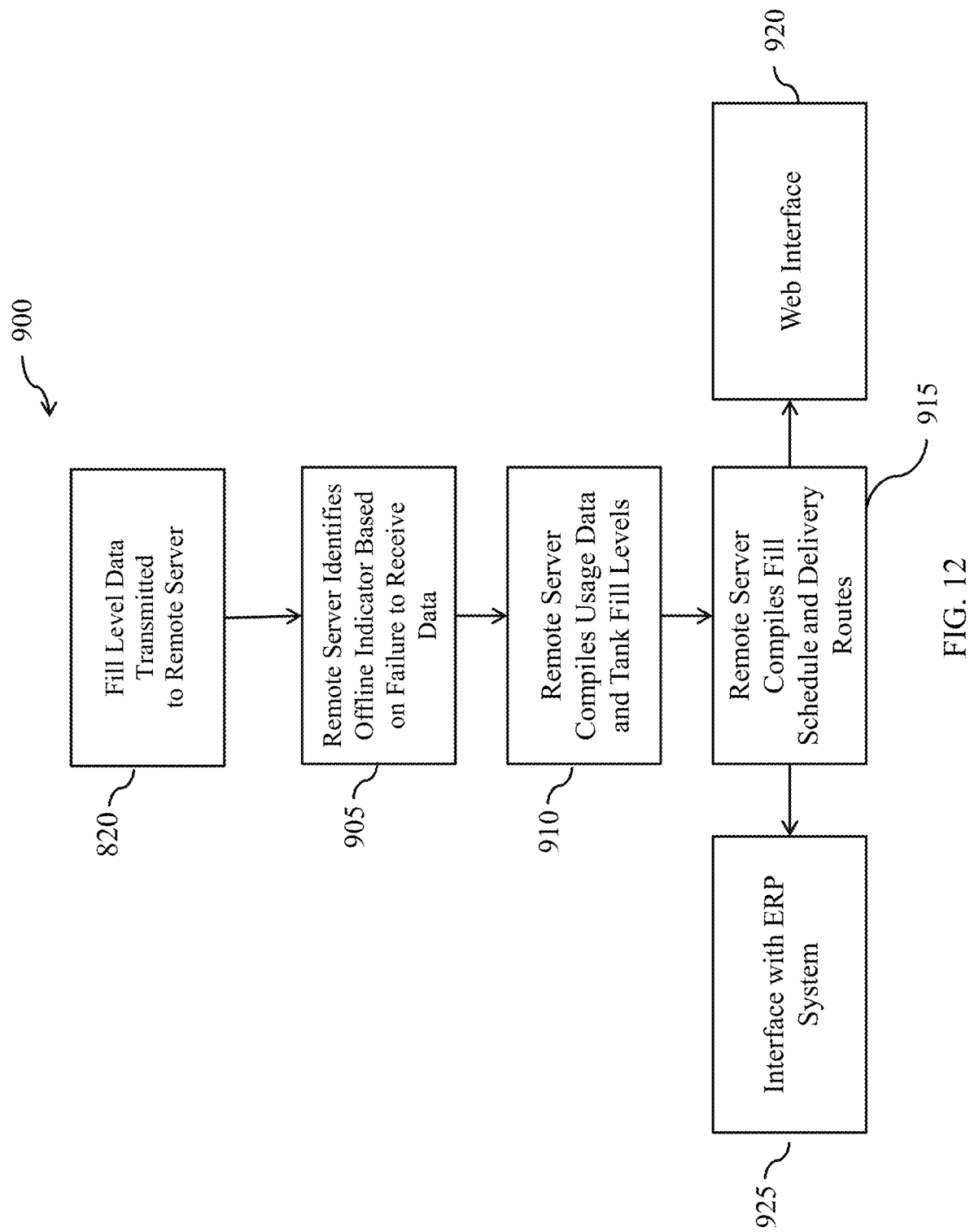
FIG. 12 is a process diagram of an illustrative embodiment of a data trending method according to the present disclosure.

As shown in FIG. 12, an illustrative process associated with a data analysis method 900 according to the present disclosure includes the following steps: fill level transmitted to remote server in Step 820, the server 380 identifies offline indicator based on failure to receive data 380 in Step 905, the server 380 compiles usage data and container fill levels in Step 910, the server 380 compiles fill schedule and delivery routes in Step 915, analysis is viewed via a web interface in Step 920, and the server 380 interfaces with ERP systems in Step 925.

Figure 13:
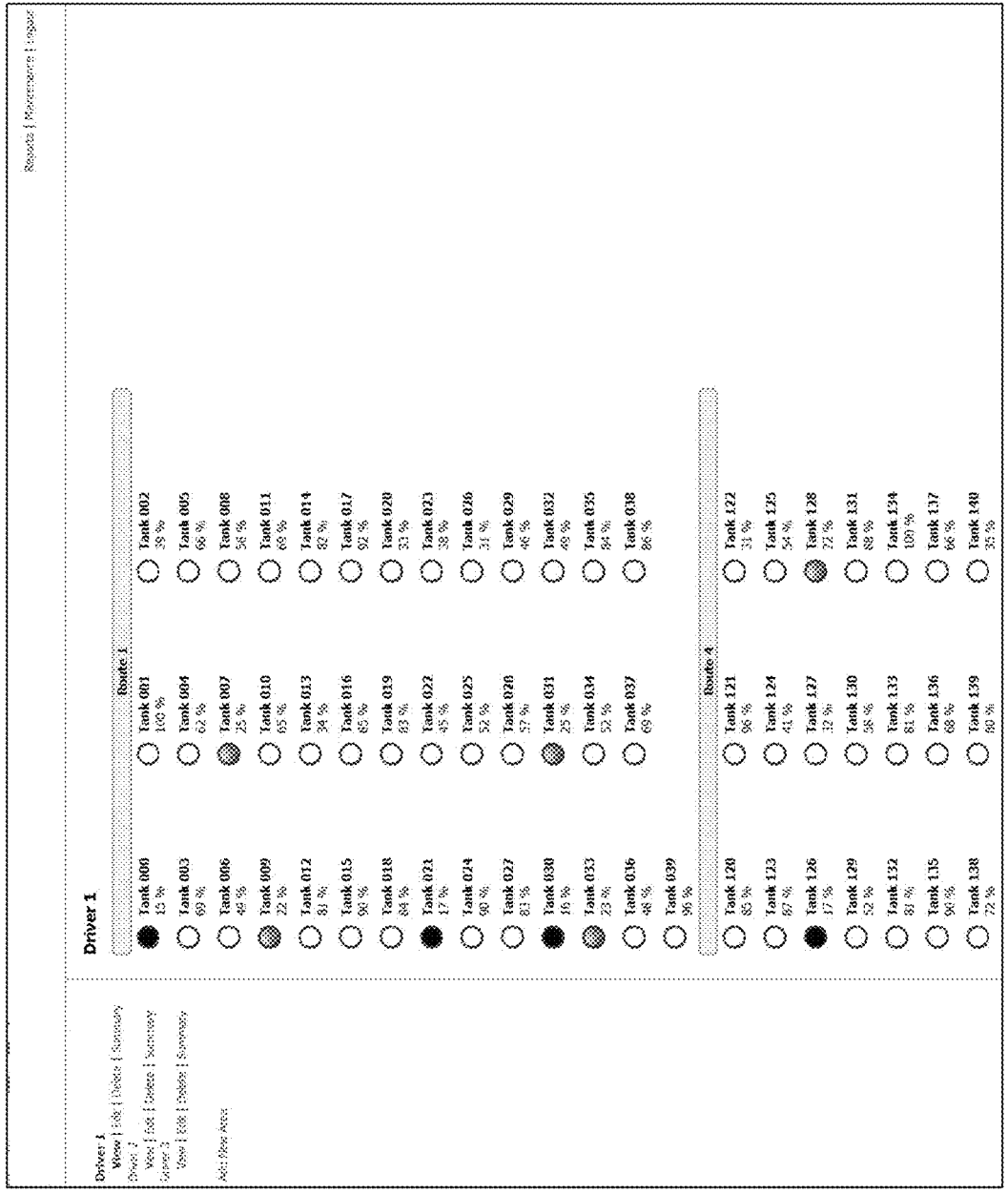
FIG. 13 is an illustrative screen display produced by the methods and systems of the present disclosure.
Figure 14:
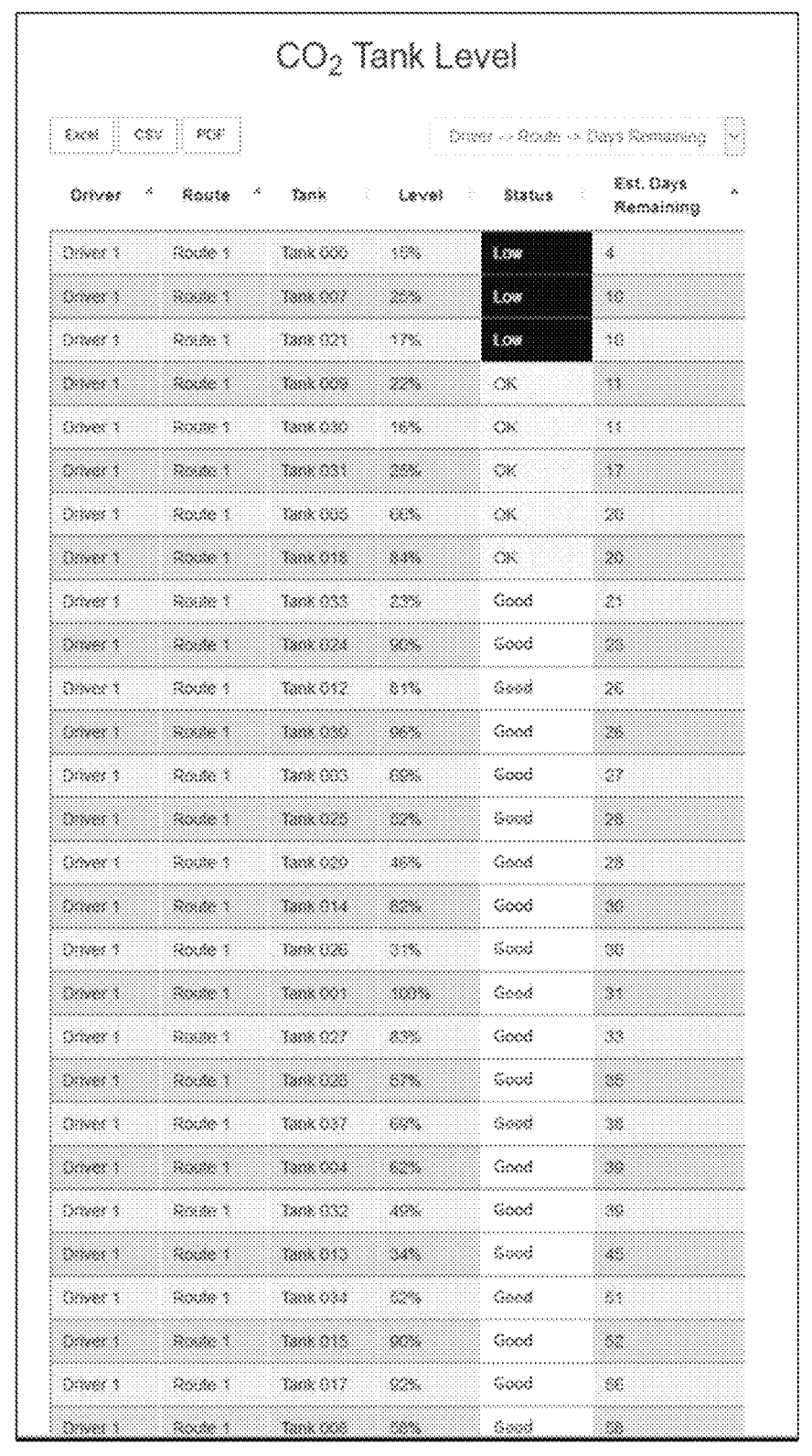
Figure 15:
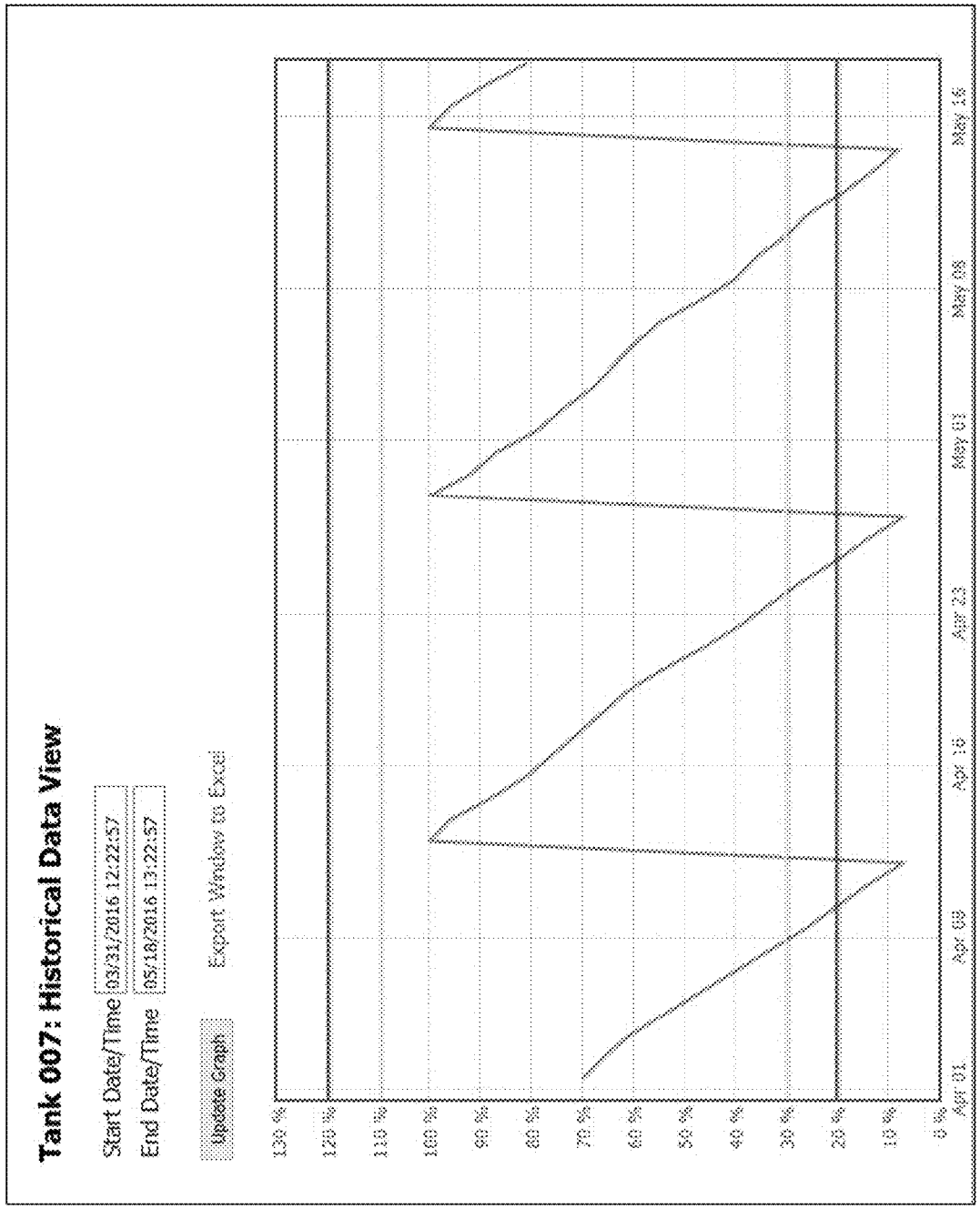
FIG. 15 is an illustrative history graph produced by the methods and systems of the present disclosure.

In steps 920 and 925 and as shown in the illustrative screen display of FIG. 13 and illustrative report of FIG. 14, usage data, including current container fill level and estimated days until the container reaches an empty state, can be displayed by a particular driver and/or driver's route so the driver can readily identify container fill levels and prioritize container refilling. Additionally, as shown in the illustrative history graph of FIG. 15, historical data for one or more containers can be displayed in a fill level versus time graph over a specified date range.

Optionally, an ANN model or other machine learning algorithm may be deployed for refill optimization purposes. Upon the repeated collection of operational data garnered from periodic refills over time, the operational data can be utilized by the ERP system in conjunction with an ANN model to better optimize the delivery routes and timing. For example, if tank 1 in location A is 10% full while tank 2 in location B is 20% full, the delivery driver and/or ERP may assume tank 1 needs refilled before tank 2. However, if tank 2 is generally used at a much faster rate than tank 1, then tank 2 may need to be refilled first. Data gathered through periodic refilling may allow the user to develop a machine-learning ANN model with inputs specific to usage rates taking into account delivery routes, travel distance, local events, days of the week, seasonal variations, holidays, etc. This ANN model would allow the system to become more accurate in predicting refill necessity and optimizing delivery routes and times.

In an illustrative embodiment, the fill level indicator 200 of an illustrative embodiment can be configured to report back to the server 380 at a specified frequency, e.g. frequency ranges anywhere from once an hour to once a month. Users can customize reporting to view, sort, or filter compiled data in a variety of different ways in steps 920/925. For example, data can be viewed based on a particular container 110, a particular driver, or a particular driver's route. Users can also define report or event triggers, such as predictive fill dates. An offline alarm function provides user notification that a fill indicator has not reported on schedule in Step 905. In an illustrative embodiment, the server sends an alert to a driver in Step 925 to check the device and troubleshoot any number of exemplary problems, including dead batteries, vandalism, or environmentally related issues such as a lightning strike.

Data processing 900 can be performed on the indicator 200 or at the server 380 level. In an illustrative embodiment, data is tracked and trended in Step 910 at the server level in such a way that users can access the server 380 and see information at Step 910, including usage and fill levels. An illustrative typical user may be a fill service provider, but could also be an end user of the container 110. The ability to view this information remotely in steps 920/925 allows users to eliminate wasted trips to check fill level or fill unnecessarily when the level is not low, thereby eliminating associated wasted costs such as driver time, fill equipment time, and any safety or equipment risks that may be associated with the supplier refill process. As an example, a low fill level that would normally trigger a refill based solely on level may be identified by the server 380 as having a low usage rate, therefore not in a critical refill state. Alternatively, a container 110 having a higher level may be identified for refilling based on a history of high usage rate, thereby eliminating a potential situation where a container runs dry. By utilizing usage data, fill levels, and contents of delivery trucks, the server 380 can optimize driver's fill routes at Step 915 based on factor such as priority fill sites, minimal number of miles travelled, shortest amount of time, or even smallest number of left turns.

In an alternative illustrative embodiment, fill level indicator 200 of system 150 includes a vibration device 220 that provides an impulse excitation of the outer wall 120 of container 110, for example, by a solenoid or other electromechanical device. With an impulse excitation, the outer wall 120 will have the largest amplitude at the resonance frequency, which in a single-wall tank installation will vary by fill level. Additionally, the alternative illustrative embodiment may include a machine learning algorithm, for example, as discussed above, to determine the fill level based on the resonance frequency. Additionally, or alternatively, for a two-wall tank, at least a portion of the components of sensor housing 210 and/or at least a portion of the components of main housing 310 can be located between outer wall 120 and inner wall 130, for example, mounted on the inner side of outer wall 120 or on the outer side of inner wall 130, for example, if system 150 is incorporated during the original construction of container 110 rather than as a retrofitting. Additionally, or alternatively, the container level being measured can be a solid material, for example, a bulk material such as an aggregate, or a mix of one or more materials in more than one state, for example, a liquid and a gas, a liquid and a solid, or a liquid, solid, and gas.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A system for determining a fill level of an inner tank of a container including a rigid inner tank and a rigid outer tank, comprising:

a resonator for vibrating an outer surface of the outer tank and inducing a resonance vibration of the outer tank and a resonance vibration of the inner tank;

a vibration detecting device for detecting a data signal indicative of a combined response vibration including the resonance vibration of the outer tank and the resonance vibration of the inner tank;

a data storage medium storing a machine learning algorithm;

a first data processing module for sampling the data signal from the vibration detecting device to provide response data indicative of the combined response vibration; and a second data processing module inputting the response data into the machine learning algorithm, the machine learning algorithm receiving the response data and outputting a fill level measurement of the inner tank;

wherein the machine learning algorithm is trained through machine learning, including the process of selecting model inputs and outputs to define an internal structure of the machine learning algorithm, applying a collection of input and output data samples to train the machine learning algorithm, and verifying the accuracy of the machine learning algorithm by applying input data samples and comparing received output values with expected output values.

2. The system of claim 1, wherein the resonance frequency of the outer tank is a static resonant frequency and the resonance frequency of the inner tank varies depending on the fill level of the inner tank.

3. The system of claim 2, wherein:
the data signal includes a resultant beating effect reflected in an amplitude envelope of the combined response vibration; and
at least one of the first and second data processing modules detects the amplitude envelope of the combined response vibration before further processing the data signal.

4. The system of claim 1, further comprising a wireless data transmission device in connection with a remote server, the remote server including the first and second data processing modules and the data storage medium, wherein the wireless data transmission device transmits the data signal to the remote server for processing by the first and second data processing modules.

5. The system of claim 1, further comprising a wireless data transmission device in connection with a remote server, the remote server including the second data processing module and the data storage medium, wherein the wireless data transmission device transmits the response signal to the remote server for processing by the second data processing module.

6. The system of claim 5, wherein a user can access the remote server via a user computing device.

7. The system of claim 5, wherein the remote server collects operational data, including the response data and the corresponding fill level measurements, and uses it to train the machine learning algorithm to improve its accuracy.

8. The system of claim 5, the remote server further comprising a data repository for collecting the response data for training the machine learning algorithm.

9. The system of claim 1, wherein the machine learning algorithm is a regression neural network model.

10. The system of claim 1, wherein control software uses historical usage data and the fill level measurement of the container along with a known quantity of a liquid stored on a liquid delivery truck to optimize delivery routing.

11. The system of claim 1, wherein one of the first or second data processors compares the fill level measurement to a historical fill level measurement and identifies a leak in the container.

12. The system of claim 1, wherein one of the first or second data processors classifies the data signal as normal or dampened, and the system alerts a user if the data signal is classified as dampened.

13. The system of claim 1, wherein the system initiates fill level measurements at a first rate of measurements per day during a first length of time and at a second rate of measurements per day upon expiration of the first length of time.

14. A method for training a neural network model to determine a liquid fill level of an inner tank in a container system having an inner tank and an outer tank, the container system having a resonator for vibrating an outer surface of the outer tank, a vibration detecting device, and a processing module for sampling a data signal detected by the vibration detecting device, the data signal including an amplitude envelope signal reflective of a beating effect of the combined response vibration of the static outer tank resonant vibration and the varying inner tank resonant vibration, the method comprising the acts of:

defining a number of data inputs for a neural network model;

collecting a set of vibration response data including one or more data signals representative of sampled vibration signals each including the amplitude envelope signal, each data signal having a known output representative of a liquid fill level in the inner tank, the set of vibration response data capable of being input into the neural network model;

selecting an internal structure for the neural network model, the internal structure having one or more hidden layers, each hidden layer having one or more neurons, wherein each neuron in each hidden layer is connected to each neuron in each adjacent hidden layer;

applying a first portion of the set of vibration response data to the neural network model; and verifying the accuracy of the neural network model by applying a second portion of the set of vibration response data to the neural network model and comparing a received output value with an expected output value representative of a container fill level.

15. The method of claim 14, wherein operational data, including real-time vibration response data and corresponding fill level measurements, is applied to the neural network model to improve its accuracy.

16. A liquid container refill management system for determining a liquid fill level in a container, the container including an inner tank and an outer tank, comprising:

a container fill level indicator capable of detecting a vibration response signal on an outer surface of the container, wherein the vibration response signal includes an amplitude envelope beating effect resulting from an interference between a static resonant vibration of the outer tank and a varying resonant vibration of the inner tank, the amplitude envelope beating effect varying with the liquid fill level of the inner tank;

a wireless transceiver associated with the container fill level indicator and capable of receiving and transmitting the vibration response signal; and a remote data processor in communication with the wireless transceiver, the remote data processor receiving the vibration response signal and inputting it into a trained machine learning algorithm to determine the liquid fill level in the inner tank;

wherein the machine learning algorithm is trained using supervised machine learning, including the process of selecting model inputs and outputs to define an internal structure of the machine learning algorithm, applying a collection of input and output data samples to train the machine learning algorithm, and verifying the accuracy of the machine learning algorithm by applying input data samples and comparing received output values with expected output values.

17. The system of claim 16, wherein the machine learning algorithm is a regression neural network model.

18. The system of claim 16, further comprising a remote server, wherein the remote server collects operational data, including the vibration response signal and the liquid fill level, and uses it to train the machine learning algorithm to improve its accuracy.

19. The system of claim 16, wherein control software uses historical usage data and the real-time liquid fill level of the container along with a known quantity of a liquid stored on a liquid delivery truck to optimize delivery routing.

20. The system of claim 16, wherein the remote data processor compares the liquid fill level to a historical liquid fill level and identifies a leak in the container.

21. The system of claim 16, wherein the remote data processor classifies the data signal as normal or dampened, and the remote data processor alerts a user if the data signal is classified as dampened.

\* \* \* \* \*